US012803754B2

(12) United States Patent
Gonuguntla et al.

(10) Patent No.: US 12,803,754 B2
(45) Date of Patent: Nov. 17, 2026

(54) CARRIER AGGREGATION TECHNIQUE

(71) Applicant: Telefonaktiebolaget LM Ericsson (publ), Stockholm (SE)

(72) Inventors: Venkatarao Gonuguntla, Sundbyberg (SE); Christian Bergljung, Lund (SE); Magnus Larsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 340 days.

(21) Appl. No.: 18/703,411

(22) PCT Filed: Oct. 21, 2022

(86) PCT No.: PCT/EP2022/079425
§ 371 (c)(1),
(2) Date: Apr. 22, 2024

(87) PCT Pub. No.: WO2023/067165
PCT Pub. Date: Apr. 27, 2023

(65) Prior Publication Data

US 2024/0421958 A1 Dec. 19, 2024

(30) Foreign Application Priority Data

Oct. 22, 2021 (IN) ............................. 202111048329

(51) Int. Cl.
*H04L 5/00* (2006.01)
*H04B 7/06* (2006.01)

(52) U.S. Cl.
CPC ....... *H04L 5/0053* (2013.01); *H04B 7/06956* (2023.05); *H04L 5/0023* (2013.01)

(58) Field of Classification Search
CPC ..... H04L 5/0053; H04L 5/0023; H04L 5/009; H04B 7/06956; H04B 7/0602
See application file for complete search history.

(56) References Cited

U.S. PATENT DOCUMENTS

2018/0310213 A1* 10/2018 Kazmi .................. H04W 36/06
2019/0116530 A1* 4/2019 Da Silva ........... H04W 36/0085
(Continued)

FOREIGN PATENT DOCUMENTS

EP 4277187 A1 * 11/2023 ........... H04L 5/0082
EP 4080936 B1 * 9/2025 ........ H04W 36/0083
(Continued)

OTHER PUBLICATIONS

3GPP, "3rd Generation Partnership Project; Technical Specification Group Radio Access Network; NR; Radio Resource Control (RRC) protocol specification (Release 16)", 3GPP TS 38.331 V16.6.0, Sep. 2021, 1-961.

(Continued)

*Primary Examiner* — Sujoy K Kundu
*Assistant Examiner* — Vladislav Y Agureyev
(74) *Attorney, Agent, or Firm* — Sonoda & Kobayashi Intellectual Property Law; Sarvajit S. Patil

(57) ABSTRACT

A technique using carrier aggregation, CA, is described. As to a method aspect of the technique in a radio device for communication with a network node, at least two downlink component carriers, CCs, of the CA are received from the network node in a common receiver beam, RX beam, of the radio device. A control message is transmitted from the radio device to the network node, the control message relating to at least one temporal gap, for each of the at least two CCs, in at least one of a reception of the communication from the network node at the radio device and a transmission of the communication from the network node to the radio device. The common RX beam is switched during the at least one temporal gap.

20 Claims, 10 Drawing Sheets

(Reference Example)

(56) References Cited

U.S. PATENT DOCUMENTS

| | | | | |
|---|---|---|---|---|
| 2019/0229868 | A1* | 7/2019 | Siomina | H04L 5/001 |
| 2019/0254076 | A1* | 8/2019 | Siomina | H04W 74/002 |
| 2019/0357068 | A1* | 11/2019 | Yiu | H04L 5/001 |
| 2020/0067615 | A1* | 2/2020 | Ghanbarinejad | H04B 7/0691 |
| 2020/0260486 | A1* | 8/2020 | Zhou | H04W 28/0278 |
| 2020/0322887 | A1* | 10/2020 | Pao | H04W 24/10 |
| 2020/0383118 | A1* | 12/2020 | Park | H04W 72/046 |
| 2020/0404690 | A1* | 12/2020 | Lee | H04L 5/001 |
| 2021/0345323 | A1* | 11/2021 | Axmon | H04W 72/12 |
| 2022/0045732 | A1* | 2/2022 | Islam | H04B 7/0695 |
| 2022/0060221 | A1* | 2/2022 | Ko | H04L 5/0051 |
| 2022/0256589 | A1* | 8/2022 | Sakhnini | H04W 74/004 |
| 2022/0361006 | A1* | 11/2022 | Xu | H04B 7/088 |
| 2023/0042400 | A1* | 2/2023 | Gursu | H04W 56/001 |
| 2023/0103927 | A1* | 4/2023 | Bai | H04L 5/001 370/350 |
| 2023/0121938 | A1* | 4/2023 | Zhou | H04B 7/06964 375/347 |
| 2024/0031839 | A1* | 1/2024 | Li | H04W 24/08 |
| 2024/0146486 | A1* | 5/2024 | Manolakos | G01S 5/021 |
| 2024/0172223 | A1* | 5/2024 | Yuan | H04W 72/02 |
| 2024/0178962 | A1* | 5/2024 | Cui | H04L 5/0094 |

FOREIGN PATENT DOCUMENTS

| | | | | |
|---|---|---|---|---|
| EP | 4132072 B1 * | 2/2026 | | H04W 24/10 |
| WO | WO-2022020851 A1 * | 1/2022 | | H04W 24/10 |

OTHER PUBLICATIONS

3GPP TS 38.133 V17.3.0, "3GPP TS 38.133 V17.3.0", 3rd Generation Partnership Project; Technical Specification Group Radio Access Network; NR; Requirements for support of radio resource management (Release 17), Sep. 2021, 1-3207.

Moderator (Apple), "[96e][220] NR_RF_FR2_req_enh_RRM", 3GPP TSG-RAN4 Meeting #95-e, R4-2012051, Electronic meeting, Aug. 18-27, 2020, 1-16.

Moderator (Nokia, Nokia Shanghai), "Email discussion summary for [100-e][216] NR_RF_FR2_req_enh2_RRM", 3GPP TSG-RAN WG4 Meeting # 100-e, R4-2115391, Electronic Meeting, Aug. 16-27, 2021, 1-54.

Nokia, et al., "Discussion on FR2 inter-band DL CA MRTD requirements for CBM capable UE", 3GPP TSG-RAN WG4 Meeting#100e, R4-2114017, E-meeting, Aug. 16-27, 2021, 1-8.

Nokia, et al., "Revised WID Further enhancements of NR RF requirements for frequency range 2 (FR2)", 3GPP TSG RAN meeting #92e, RP-211538, Electronic Meeting, Jun. 14-18, 2021, 1-6.

Nokia, "WF on RRM requirements for FR2 Inter-band DL CA and UL CA", 3GPP TSG-RAN WG4 Meeting # 100-e, R4-2115332, Electronic Meeting, Aug. 16-27, 2021, 1-6.

Qualcomm Incorporated, "MRTD requirements for CBM based Inter-band DL CA", 3GPP TSG-RAN WG4 Meeting # 100-e, R4-2112702, Electronic Meeting, Aug. 16-27, 2021, 1-3.

* cited by examiner

300

400

(Reference Example)

CARRIER AGGREGATION TECHNIQUE

CROSS-REFERENCE TO RELATED APPLICATIONS

This patent application is a submission under 35 U.S.C. § 371 for U.S. national stage patent application of international application no. PCT/EP2022/079425 filed on Oct. 21, 2022 and entitled "CARRIER AGGREGATION TECHNIQUE," which claims priority to India Patent Application No. IN 202111048329 filed on Oct. 22, 2021, the entireties of both of which are incorporated herein by reference.

TECHNICAL FIELD

The present disclosure relates to a technique for carrier aggregation. More specifically, and without limitation, methods and devices are provided for switching a beamformed communication using carrier aggregation.

BACKGROUND

Carrier aggregation (CA) is one of the most successful features of the radio access technology (RAT) Long Term Evolution (LTE) specified by the Third Generation Partnership Project (3GPP) since CA allows up to five component carriers (CCs) simultaneously to be aggregated for a radio device (or user equipment, UE) such as a mobile terminal, which effectively increases the maximum bandwidth fivefold, up to 100 MHz in the case of LTE. CA has been adopted to the Fifth Generation (5G) New Radio (NR) as well, for which up to 16 CCs can be configured for any given radio device, which gives the radio device up to approximately 1 GHz of maximum bandwidth.

Moreover, dual connectivity (DC) allows a radio device to simultaneously transmit and receive data on multiple CCs from two serving network nodes (e.g., a gNodeB, gNB) or cell groups, namely a master node (MN) and a secondary node (SN). DC is allowed between two serving network nodes operating in the same technology (both NR, both LTE, for example), or operating in different RATs, such as MN operating in LTE while SN is operating in NR, or vice versa. For example, using an LTE MN and NR SN (known as EN-DC) allows radio access networks (RANs) to employ both 4G and 5G to increase user throughput utilizing the wide 5G spectrum while providing the radio device with a wider coverage by virtue of the 4G spectrum.

Furthermore, with 5G millimeter wave enabling directional communication with a larger number of antenna elements (or briefly: antennas) in an antenna panel and providing an additional beamforming gain, efficient management of beams has become crucial. For directional communication in the DL communication, the radio device may be capable of controlling its parameters for a beamformed reception (which is also referred to as Beam Management, BM) according to a Common Beam Management (CBM) or an Independent Beam Management (IBM).

However, when a radio device capable of CBM uses its common receiver beam for receiving multiple CCs, a received time difference (RTD) between the CCs reduces or even eliminates the time available for switching the receiver beam.

SUMMARY

Accordingly, there is a need for a carrier aggregation technique that improves the handling of beam switching, particularly for CBM.

As to the first method aspect, a method in a radio device for communication with a network node using carrier aggregation (CA) is provided. The method comprises the step of receiving at least two downlink component carriers (CCs) of the CA from the network node in a common receiver beam (RX) of the radio device. The method further comprises the step of transmitting a control message from the radio device to the network node, the control message relating to at least one temporal gap, for each of the at least two CCs, in at least one of a reception of the communication from the network node at the radio device and a transmission of the communication from the network node to the radio device. The method further comprises the step of switching the common or RX beam during the at least one temporal gap.

While the technique is described primarily for carrier aggregation (CA), the technique is also applicable to dual connectivity (DC) (including multi-connectivity) instead of CA. The CA may relate to the at least two CCs being anchored at a medium access control (MAC) layer of the network node. The DC may relate to the at least two CCs being anchored at a packet data convergence protocol (PDCP) layer of the network node. Alternatively or in addition, the CA may be replaced by a Multi-Radio Dual Connectivity (MR-DC) (e.g., supported by NG-RAN) whereby the radio device in a radio resource connected state (RRC_CONNECTED) is configured to utilize radio resources provided by two distinct schedulers, located in two different network node (at least one of which may perform the method), e.g., connected via a non-ideal backhaul. One of the network nodes may provide NR access and the other one may provide either E-UTRA (i.e., LTE) access or NR access.

Each of the component carriers (CCs) may be associated with a frequency block. The CCs may be non-overlapping in the frequency domain. The CCs may be intra-band CCs (e.g., contiguous CCs) or inter-band CCs.

The at least one temporal gap may be present on each of the at least two CCs. Alternatively or in addition, the at least one temporal gap for each of the at least two CCs may also be referred to as the at least one temporal gap on each of the at least two CCs.

A beam management type or beam management capability of the radio device for the common RX beam may comprise common beam management (CBM), e.g., as opposed to individual beam management (IBM).

The switching of the RX beam may be triggered by the network node or the radio device in the at least one temporal gap indicated by the network node.

The temporal gap may briefly be referred to as the gap.

The communication using the at least two CCs may comprise DL data and/or DL control signaling.

The at least two CCs (e.g., according to the first method aspect) may be received from at least two antenna panels, respectively, of the network node in the common RX beam. The switching may comprise switching the common RX beam from covering the at least two antenna panels to covering another at least two antenna panels.

The at least two antenna panels covered prior to the switching may be quasi-collocated (QCL). Alternatively or in addition, the other at least two antenna panels covered after the switching may be quasi-collocated (QCL). Any antenna panel of the at least two antenna panels covered prior to the switching and any antenna panel of the other at least two antenna panels covered after the switching may be not quasi-collocated.

Each antenna panel may comprise one or more antennas of the network node. Each antenna panel may transmit one of the at least two CCs using the one antenna or the antennas (e.g., directed in a beamformed transmission to the radio device).

At least one of the respective temporal gaps on the at least two CCs, respective radio frames on the at least two CCs, respective subframes on the at least two CCs, respective slots on the at least two CCs, and respective orthogonal frequency division multiplexing (OFDM) symbols on the at least two CCs may be offset in time between the at least two CCs according to a received time difference (RTD), at the radio device.

Each of the at least one temporal gap on one of the at least two CCs may correspond to one temporal gap on another one of the least two CCs offset in time by the RTD. Alternatively or in addition, each of the at least one temporal gap on one of the least two CCs may correspond to one temporal gap on another one of the least two CCs offset in time by the RTD.

The RDT (e.g., according to the first method aspect) may be a sum of a timing alignment error (TAE) between the at least two CCs at the network node and a propagation delay difference between the at least two CCs when propagating from the network node to the radio device.

The control message (e.g., according to the first method aspect) may be indicative of the at least one temporal gap on each of the at least two CCs, optionally of at least one of a position of the at least one temporal gap in the time domain; a gap offset relative to a radio frame, subframe or slot for the at least one temporal gap; a gap periodicity of the at least one temporal gap; and a duration of each of the at least one temporal gap.

The control message (e.g., according to the first method aspect) may be indicative of a request of the radio device for switching the RX beam in the at least one temporal gap.

The request of the radio device may be indicative of a need for the at least one temporal gap.

The control message (e.g., according to the first method aspect) may be indicative of a capability of the radio device for switching the RX beam in the at least one temporal gap.

The method (e.g., according to the first method aspect) may further comprise receiving a scheduling message from the network node at the radio device. The scheduling message may be indicative of the at least one temporal gap on each of the at least two CCs, optionally of at least one of a position of the at least one temporal gap in the time domain; a gap offset relative to a radio frame, subframe or slot for the at least one temporal gap; a gap periodicity of the at least one temporal gap; and a duration of each of the at least one temporal gap.

The scheduling message may be received in response to the control message (e.g., in response to the request). Alternatively or in addition, the scheduling message may be received when the network node controls the radio device for the switching of the RX beam.

The control message and/or the scheduling message may be indicative of the at least one temporal gap on each of the at least two CCs by indicating the position and/or duration of at least one temporal gap on one of the at least two CCs. The position of at least one temporal gap on the one or more other CCs may correspond to the offset in time by the RTD. The duration of at least one temporal gap on the different CCs may be equal.

The at least one temporal gap on each of the at least two CCs (e.g., according to the first method aspect) may be aperiodic or comprises at least one aperiodic temporal gap, optionally comprising a sequence of OFDM symbols across multiple slots.

The at least one temporal gap on each of the at least two CCs (e.g., according to the first method aspect) may comprise a plurality of periodic temporal gaps.

The at least one temporal gap on each of the at least two CCs (e.g., according to the first method aspect) may be at an uplink to downlink switch boundary, a downlink to uplink switch boundary, a boundary of a radio frame, a boundary of a subframe, a boundary of a slot or a boundary of an OFDM symbol of the respective CC.

The common RX beam (e.g., according to the first method aspect) may be a beamformed RX beam of the radio device.

The switching of the common RX beam (e.g., according to the first method aspect) may comprise changing at least one of a direction of the common RX beam; a width of the common RX beam; and beamforming weights of the common RX beam.

The at least one temporal gap on each of the at least two CCs (e.g., according to the first method aspect) may comprise at least one RX beam management gap for the switching of the RX beam and at least one radio resource management (RRM) gap for RRM measurements.

A duration of the RRM gap may be greater than a duration of the RX beam management gap.

The method (e.g., according to the first method aspect) may further comprise performing the RRM measurements in the at least one RRM gap responsive to the scheduling message being indicative of the at least one RRM gap.

Alternatively or in addition, the switching of the RX beam may be performed in the at least one RRM gap.

The at least one RX beam management gap (e.g., the at least one temporal gap) for the switching (e.g., according to the first method aspect) of the RX beam and/or at least one RRM gap for the RRM measurements are scheduled based on and/or in response to channel state information (CSI) reported from the radio device to the network node.

As to a second method aspect, a method in a network node for communication with a radio device using carrier aggregation (CA) is provided. The method comprises the step of transmitting at least two downlink component carriers (CCs) of the CA from the network node using at least two quasi-collocated antenna panels, respectively. The method further comprises the step of receiving a control message from the radio device at the network node, the control message relating to at least one temporal gap, for each of the at least two CCs, in at least one of a transmission of the communication from the network node to the radio device and a reception of the communication from the network node at the radio device. The method further comprises the step of switching, during the at least one temporal gap, the transmission of the at least two downlink CCs of the CA to other at least two quasi-collocated antenna panels and/or transmitting a scheduling message indicative of the at least one temporal gap to the radio device for the radio device to switch its common receiver beam (RX beam) during the at least one temporal gap.

The second method aspect may further comprise any feature and/or any step disclosed in the context of the first method aspect, or a feature and/or step corresponding thereto, e.g., a receiver counterpart to a transmitter feature or step.

The corresponding features or steps may be obtained by replacing a transmission by a reception or vice versa, and/or by replacing a common RX beam by collocated at least two antenna panels, and/or by replacing the received time difference (RTD) by a time alignment error (TAE).

As to another aspect, a computer program product is provided. The computer program product comprises program code portions for performing any one of the steps of the first method aspect or the second method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a radio device for communication with a network node using carrier aggregation (CA) is provided. The radio device comprises memory operable to store instructions and processing circuitry operable to execute the instructions such that the radio device is operable to receive at least two downlink component carriers (CCs) of the CA from the network node in a common receiver beam (RX beam) of the radio device. The radio device is further operable to transmit a control message from the radio device to the network node, the control message relating to at least one temporal gap, for each of the at least two CCs, in at least one of a reception of the communication from the network node at the radio device and a transmission of the communication from the network node to the radio device. The radio device is further operable to switch the common RX beam during the at least one temporal gap.

The radio device (e.g., according to the first device aspect) may further be operable to perform any one of the steps of the first method aspect.

As to another first device aspect a radio device for communication with a network node using carrier aggregation (CA) is provided. The radio device is configured to receive at least two downlink component carriers (CCs) of the CA from the network node in a common receiver beam, RX beam, of the radio device. The radio device is further configured to transmit a control message from the radio device to the network node, the control message relating to at least one temporal gap, for each of the at least two CCs, in at least one of a reception of the communication from the network node at the radio device and a transmission of the communication from the network node to the radio device. The radio device is further configured to switch the common RX beam during the at least one temporal gap.

The radio device (e.g., according to the first device aspect) may further configured to perform any one of the steps of the first method aspect.

As to another first device aspect a user equipment (UE), embodying the radio device of the first device aspect is provided.

As to the second device aspect a network node for communication with a radio device using carrier aggregation (CA) is provided. The network node comprises memory operable to store instructions and processing circuitry operable to execute the instructions such that the network node is operable to transmit at least two downlink component carriers (CCs) of the CA from the network node using at least two quasi-collocated antenna panels, respectively. The network node is further operable to receive a control message from the radio device at the network node, the control message relating to at least one temporal gap, for each of the at least two CCs, in at least one of a transmission of the communication from the network node to the radio device and a reception of the communication from the network node at the radio device. The network node is further operable to switch, during the at least one temporal gap, the transmission of the at least two downlink CCs of the CA to other at least two quasi-collocated antenna panels and/or transmit a scheduling message indicative of the at least one temporal gap to the radio device for the radio device to switch its common receiver beam (RX beam) during the at least one temporal gap.

The network node (e.g., according to the second device aspect) may further operable to perform any one of the steps of the second method aspect.

As to another second device aspect a network node for communication with a radio device using carrier aggregation (CA) is provided. The network node is configured to transmit at least two downlink component carriers (CCs) of the CA from the network node using at least two quasi-collocated antenna panels, respectively. The network node is further configured to receive a control message from the radio device at the network node, the control message relating to at least one temporal gap, for each of the at least two CCs, in at least one of a transmission of the communication from the network node to the radio device and a reception of the communication from the network node at the radio device.

The network node is further configured to switch, during the at least one temporal gap, the transmission of the at least two downlink CCs of the CA to other at least two quasi-collocated antenna panels and/or transmit a scheduling message indicative of the at least one temporal gap to the radio device for the radio device to switch its common receiver beam, RX beam, during the at least one temporal gap.

The network node (e.g., according to the second device aspect) may further configured to perform any one of the steps of the second method aspect.

As to another second device aspect a base station embodying the network node of the second device aspect is provided.

As to a system aspect, a communication system including a host computer is provided. The host computer comprises processing circuitry configured to provide user data; and a communication interface configured to forward user data to a cellular or ad hoc radio network for transmission to a user equipment (UE). The UE comprises a radio interface and processing circuitry, the processing circuitry of the UE being configured to execute any one of the steps of the first method aspect.

The communication system (e.g., according to the system aspect) may further include the UE.

The radio network (e.g., according to the system aspect) may further comprise a base station, or a radio device functioning as a gateway, which is configured to communicate with the UE.

The base station (e.g., according to the system aspect), or the radio device functioning as a gateway, may comprise processing circuitry, which is configured to execute any one of the steps of the second method aspect.

The processing circuitry of the host computer (e.g., according to the system aspect) may be configured to execute a host application, thereby providing the user data; and the processing circuitry of the UE may be configured to execute a client application associated with the host application.

The technique may be applied (e.g., the at least two CCs may be located in) a millimeter waveband (mmWave), e.g. including the frequency range 2 (FR2), e.g., in the range from 24.250 GHz to 52.600 GHz.

While the technique is described primarily for CA, any embodiment is also disclosed or realizable by replacing CA by dual connectivity (DC).

Alternatively or in addition, any aspect of the technique may be implemented by a method for handling RX beam management of the radio device through the at least one temporal gap.

Any aspect or embodiment may be implemented based on, or by extending, at least one of the 3GPP document R4-2112702, "MRTD requirements for CBM based Inter-band DL CA"; the 3GPP document TS 38.133, version 17.3.0; and the 3GPP document TS 38.331, version 16.6.0.

Any radio device may be a user equipment (UE), e.g., according to a 3GPP specification. Alternatively or in addition, any network node may be a base station or cell of a radio access network (RAN). Alternatively or in addition, the network node may serve the radio device, e.g. using the at least two CCs.

The radio device and the network node (e.g., the RAN) may be wirelessly connected in an uplink (UL) and/or a downlink (DL) through a Uu interface.

The radio device and/or the network node and/or the RAN may form, or may be part of, a radio network, e.g., according to the Third Generation Partnership Project (3GPP) or according to the standard family IEEE 802.11 (Wi-Fi). The first method aspect and the second method aspect may be performed by one or more embodiments of the radio device and the network node (e.g., a base station), respectively.

The RAN may comprise one or more embodiments of the network node (e.g., one or more base stations or one or more cells), e.g., performing the second method aspect. Alternatively or in addition, the radio network may be a vehicular, ad hoc and/or mesh network comprising two or more radio devices, e.g., acting as a remote radio device and/or a relay radio device and/or a further remote radio device mutually or pairwise connected by sidelinks (SL).

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Whenever referring to the RAN, the RAN may be implemented by one or more network nodes. The radio device may be wirelessly connected or connectable (e.g., according to a radio resource control, RRC, state or active mode) with the network node.

The network node (e.g., a base station) may encompass any station that is configured to provide radio access to any of the radio devices. The base stations may also be referred to as cell, transmission and reception point (TRP), radio access node or access point (AP). The base station and/or the relay radio device may provide a data link to a host computer providing the user data to the remote radio device or gathering user data from the remote radio device. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer, a packet data convergence protocol (PDCP) layer, and/or a Radio Resource Control (RRC) layer of a protocol stack for the radio communication.

Herein, referring to a protocol of a layer may also refer to the corresponding layer in the protocol stack. Vice versa, referring to a layer of the protocol stack may also refer to the corresponding protocol of the layer. Any protocol may be implemented by a corresponding method.

An embodiment of the technique may schedule or enable scheduling the at least one gap (i.e. room in the time domain) for a radio device beam switch and/or for a radio resource management (RRM) measurement, particularly for a CBM UE.

Any one of the devices, the UE, the base station, the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including a Wireless Local Area Network (WLAN) implementation according to the standard family IEEE 802.11, 3GPP LTE (e.g., LTE-Advanced or a related radio access technique such as MulteFire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
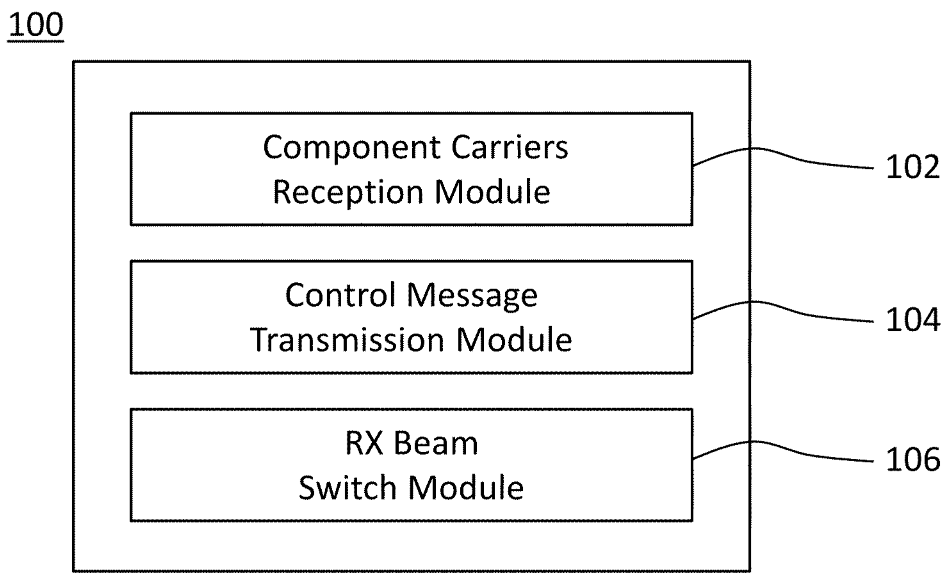
FIG. 1 shows a schematic block diagram of an embodiment of a device for communication with a network node using carrier aggregation, which may be embodied by a radio device.

FIG. 1 schematically illustrates a block diagram of an embodiment of a device for communication with a network node using carrier aggregation (CA). The device is generically referred to by reference sign 100.

The device 100 comprises a component carrier reception module 102 that receives at least two downlink component carriers (CCs) of the CA from the network node in a common receiver beam (RX beam) of the radio device.

The device 100 further comprises a control message transmission module 104 that transmits a control message from the radio device to the network node. The control message relates to at least one temporal gap for each of the at least two CCs. The temporal gap is in at least one of a reception of the communication (i.e., from the network node at the radio device) and a transmission of the communication (i.e., from the network node to the radio device).

The device 100 further comprises a receiver beam switch module 106 that switches the common RX beam during the at least one temporal gap.

Any of the modules of the device 100 may be implemented by units configured to provide the corresponding functionality.

The device 100 may also be referred to as, or may be embodied by, the radio device (or briefly: UE). The radio device 100 and the network node may be in direct radio communication, e.g., at least for the reception of the CCs and/or the transmission of the control message. The network node may be embodied by the following device 200.

Figure 2:
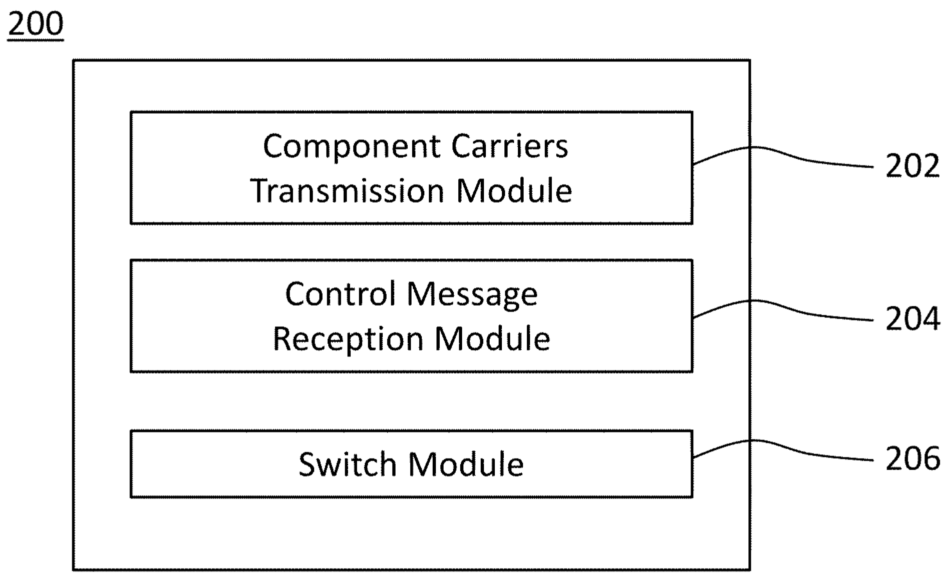
FIG. 2 shows a schematic block diagram of an embodiment of a device for communication with a network node using carrier aggregation, which may be embodied by a network node.

FIG. 2 schematically illustrates a block diagram of an embodiment of a device for communication with a radio device using carrier aggregation (CA). The device is generically referred to by reference sign 200.

The device 200 comprises a component carrier transmission module 202 that transmits at least two downlink component carriers (CCs) of the CA from the network node using at least two quasi-collocated antenna panels, respectively.

The device 200 further comprises a control message reception module 204 that receives a control message from the radio device at the network node. The control message relates to at least one temporal gap, for each of the at least two CCs. The temporal gap is in at least one of a reception of the communication (i.e., from the network node at the radio device) and a transmission of the communication (i.e., from the network node to the radio device).

The device 200 further comprises a switch module 206 that switches, optionally during the at least one temporal gap, the transmission of the at least two downlink CCs of the CA to other at least two quasi-collocated antenna panels. Alternatively or in addition, the switch module 206 transmits a scheduling message to the radio device. The scheduling message is indicative of the at least one temporal gap for (e.g., configuring and/or scheduling) the radio device to switch its common receiver beam (RX beam) during the at least one temporal gap.

Any of the modules of the device 200 may be implemented by units configured to provide the corresponding functionality.

The device 200 may also be referred to as, or may be embodied by, the network node (or briefly: gNB). The radio device and the network node 200 may be in direct radio communication, e.g., at least for the transmission of the CCs and/or the reception of the control message. The radio device may be embodied by the above device 200.

In any aspect, for example, the temporal gap in the transmission may comprise that the network node refrains from transmitting in the at least two CCs during the temporal gap. Alternatively or in addition, the gap in the reception may comprise that the radio device refrains from transmitting in the at least two CCs during the temporal gap.

Figure 3:
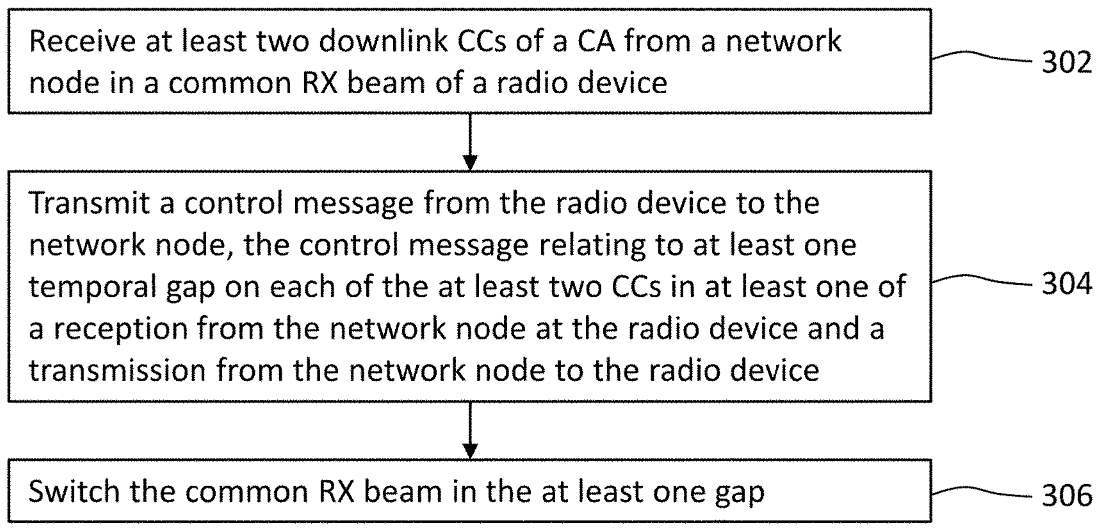
FIG. 3 shows a flowchart for a method for communication with a network node using carrier aggregation, which method may be implementable by the device of FIG. 1.

FIG. 3 shows an example flowchart for a method 300 of according to the first method aspect.

The method comprises the steps indicated in FIG. 3 and/or the steps of the first independent method claim.

The method 300 may be performed by the device 100. For example, the modules 102, 104 and 106 may perform the steps 302, 304 and 306, respectively.

Figure 4:
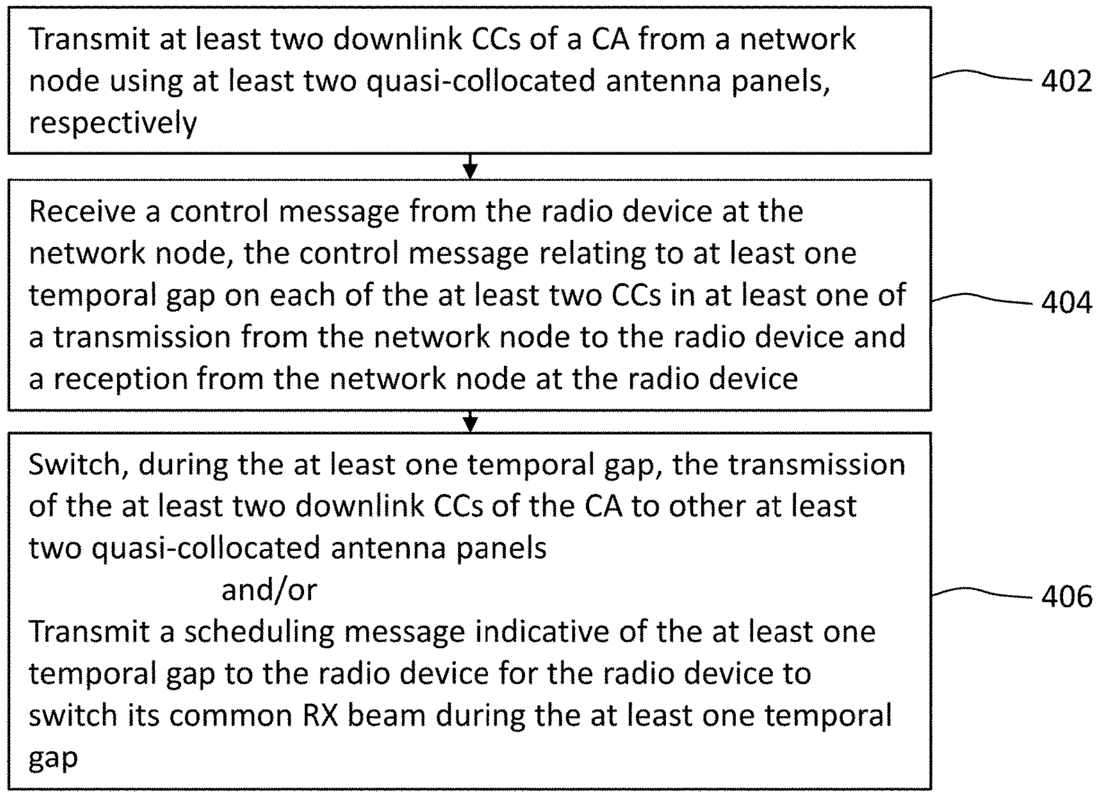
FIG. 4 shows a flowchart for a method for communication with a network node using carrier aggregation, which method may be implementable by the device of FIG. 2.

FIG. 4 shows an example flowchart for a method 400 of according to the second method aspect.

The method comprises the steps indicated in FIG. 4 and/or the steps of the second independent method claim.

The method 400 may be performed by the device 200. For example, the modules 202, 204 and 206 may perform the steps 402, 404 and 406, respectively.

For brevity, and without thereto, the radio device is referred to as a UE and the network node is referred to as a gNB.

Alternatively or in addition, in any aspect, the UE 100 may be configured with DL CA. The UE 100 indicates (e.g., by means of the control message) a need to the gNB 200 to have a gap in time (i.e., the at least one temporal gap) across the at least two CCs for UE RX beam switch and/or RRM measurement. Herein, the RRM measurement may be an example of the UE RX beam switch since the RX parameters (e.g., a spatial configuration of a beamformed reception) has to be changed as an example of the step 306 of switching the UE RX beam.

Alternatively or in addition, a position (e.g., symbols with possible offset from the slot boundary) and/or a length (i.e., duration) of the gap may be indicated in the control message.

In the step 406, the gNB 200 schedules and/or signals at least one gap across all CCs to the UE 100 for UE RX beam switch or RRM measurement according to the step 306, optionally based on a UE gap capability, which may be indicated in the control message.

The at least one gap may be or comprise periodic gaps and/or one or more triggered and/or aperiodic gaps and/or one or more gaps governed by a running timer.

The aperiodic gaps may be a sequence of symbols, optionally across multiple slots and/or having variable length.

Alternatively or in addition, the gNB 200 may trigger UE RX BM gaps based on channel state information (CSI) and/or may schedule the gap accordingly in the step 406.

In any embodiment, the at least one gaps may be on all serving cells.

In the step 306, during the gaps, the UE 100 performs RX BM switch and/or performs RRM measurements (e.g., if measurements are needed). A gap length (i.e., duration) of an RX beam management (BM) gap for RX BM may be less than (i.e., small compared to) a duration of one or each of the radio resource management (RRM) gaps for RRM measurements.

The technique may be applied to uplink (UL), downlink (DL) or direct communications between radio devices, e.g., device-to-device (D2D) communications or sidelink (SL) communications.

Each of the device 100 and the device 200 may be a radio device or a network node. Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling the radio access. For example, the base station may be an access point, for example a Wi-Fi access point.

Herein, whenever referring to noise or a signal-to-noise ratio (SNR), a corresponding step, feature or effect is also disclosed for noise and/or interference or a signal-to-interference-and-noise ratio (SINR).

Figure 6:
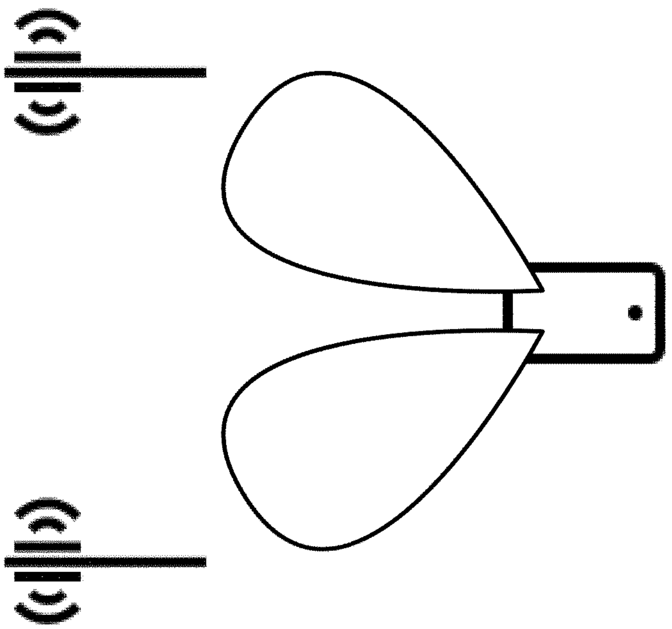
FIG. 6 schematically illustrates a reference example of a radio network for IBM.
Figure 5:
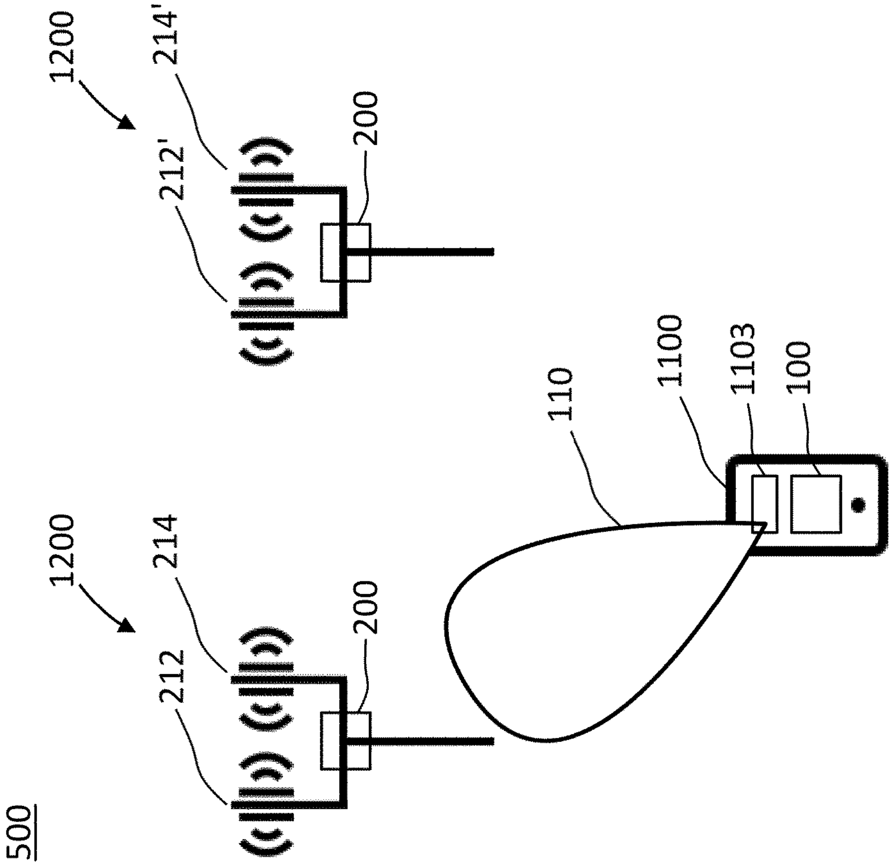
FIG. 5 schematically illustrates a first example of a radio network comprising embodiments of the devices of FIGS. 1 and 2 for performing the methods of FIGS. 3 and 4, respectively, for CBM.

In frequency range 2 (FR2) inter-band CA, the UE 100 may support two types of beam managements, namely Common Beam Management (CBM), which is schematically illustrated for an example of a radio network 500 in FIG. 5, and Independent Beam Management (IBM), which is schematically illustrated as a reference example FIG. 6. If the UE 100 is supporting CBM, the UE can only manage (i.e., control) one beam at a time. In contrast UE 100 that supports IBM can receive more than one beam from different antenna panels at the same time.

Figure 8:
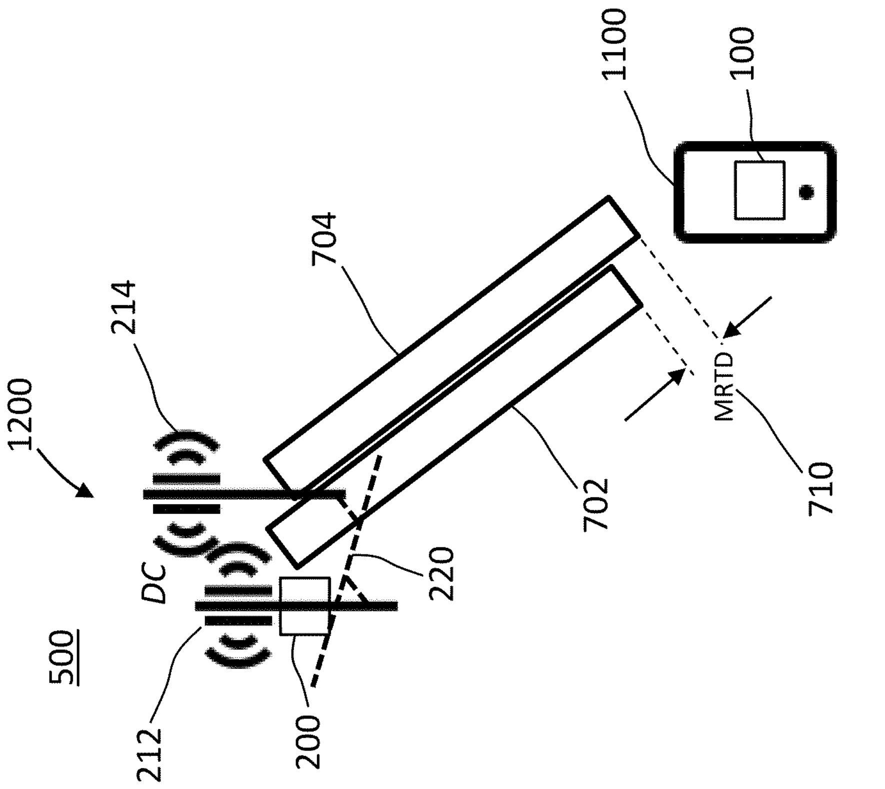
FIG. 8 schematically illustrates a third example of a radio network using dual connectivity that leads to a received time difference.
Figure 7:
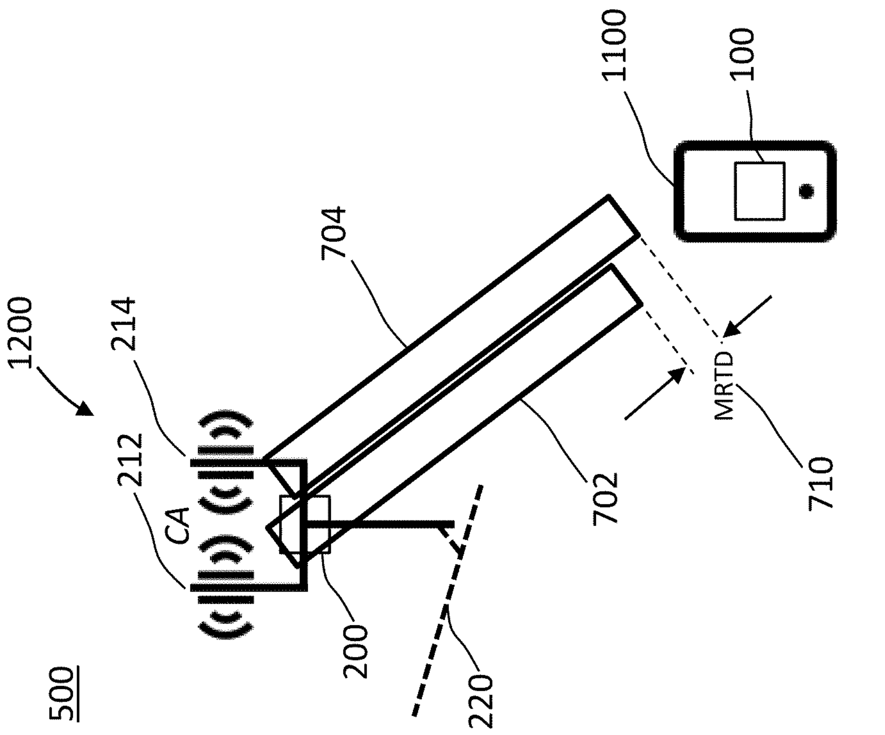
FIG. 7 schematically illustrates a second example of a radio network using carrier aggregation that leads to a received time difference.

When the different antenna panel are at different location, e.g., as shown in FIG. 7 for a network node 1200 embodying the device 200 providing carrier aggregation (CA or in FIG. 8 for two network nodes 1200 providing dual connectivity (DC), the signal (e.g., OFDM symbols 702 and 704) received at the UE 100 from the different antenna panels 212 and 214 of the network node 1200, respectively, may arrive at different time, which results in Receive Time difference (RTD) between the signals 702 and 704 from the different antenna panels 212 and 214 (e.g., different antenna elements).

Furthermore, when the antenna panels 212 and 214 are at different locations or in some cases in same location also, due to input clock differences, these antenna panels may not be perfectly synchronized. In 3GPP NR, the maximum allowed synchronization difference between these antenna panels is specified and for example for intra-band CA case this clock synchronization difference is allowed up to 160 ns (i.e., 160 nanoseconds) and for FR2 inter-band CA, the same is allowed up to 3 μs (i.e., 3 microseconds). The clock synchronization difference is also called as Timing alignment error (TAE).

Since there may exist already TAE error between different antenna panels, the RTD between the signal transmitted from different antenna panels can be denoted as RTD:

RTD=TAE+Propagation delay difference.

The TAE may be the major contribution (e.g., at least 75%) to the RTD, e.g., when the antenna panels 210 a spaced apart by few meters (e.g., 0.5 to 5 meters).

To satisfy minimum performance requirements at the UE 100, the RTD may have to be within the certain limit, which may be denoted as Maximum Receive Time Difference (MRTD). If RTD is within MRTD, the UE 100 must satisfy the performance requirements and if it is not, UE need not meet the performance requirements.

As discussed above, a CBM UE 100 can only manage one beam at any given point in time. For Carrier aggregation (CA) this leads to a necessary precondition that all Component Carriers (CC) involved in CA have to be collocated and that the CC shall have the same spatial domain filter, i.e., the same TX and RX lobes in space. Since there is no requirement that the carriers have to be synchronized, there will be an allowed TAE between the at least two CCs.

The TAE may separate frame start (or OFDM symbols 702 and 704) of the respective CCs in time at the transmitting network node 200. Alternatively or in addition, the RTD 710 may separate frame start (or OFDM symbols 702 and 704) of the respective CCs in time at the receiving radio device 100.

It has been decided in 3GPP that for inter-band FR2 carrier aggregation with CBM, all carriers have to have the same spatial beam shape and be collocated, but there is an allowed MRTD (Maximum Receive Time Difference) of up to 3 μs between carriers from the same site. The reason for this is that inter band carriers could be transmitted from different collocated BS/antenna panels and there is an allowed TAE at BS/antenna panel TX, which becomes MRTD at UE RX, since sites are collocated.

FIGS. 7 and 8 schematically illustrate a difference in the start of MRTD frames 702 and 704 between collocated CA carriers (i.e., CCs) received at the UE 100.

In CA operation, the UE 100 need to perform beam measurements periodically to check the signal strength of the serving beam and also to keep track of target beams. If the target beam becomes stronger than the serving beam UE can be requested to switch to target beam. This operation is part of beam management (BM) procedure.

The UE 100 (e.g., a NR UE) may comprise multiple antenna panels to keep track of the beams in spatial direction. For example, the network node (i.e., the network or briefly: NW) may transmit a transmit beam at gNB 200, but the UE may receive the same beam at UE 100 from different antenna panels from different direction. Based on the signal strength of Tx beam and Rx beam, UE can switch its Tx beam and/or its RX beam, e.g. spatial parameters (e.g., direction, width, beamforming weights, etc.) of the RX beam, from time to time. TX beam switching is initiated by gNB based on the measurement results obtained from the UE. However, RX beam switching is agnostic to gNB as for the same TX beam, UE may receive RX beam from different antenna panels at different times based on the signal strength received at different antenna panels. For efficient beam management, we can observe that some measurements and beam switches are triggered by the network and are deterministic at gNB, but some UE measurements and RX beam switches could be UE autonomous and not known to gNB.

Given that a CBM UE can only receive one beam at a time, and with the existence of RTD 710 between signals (e.g., OFDM symbols 702 and 704) from (e.g., on) different CCs 902 and 904 (i.e., the offset in time of signals between the CCs 902 and 904), any change in RX beam due to RX beam switching 306 without the temporal gap can result in loss of data during the RX beam switch duration $T_{Beam}$.

Figure 9:
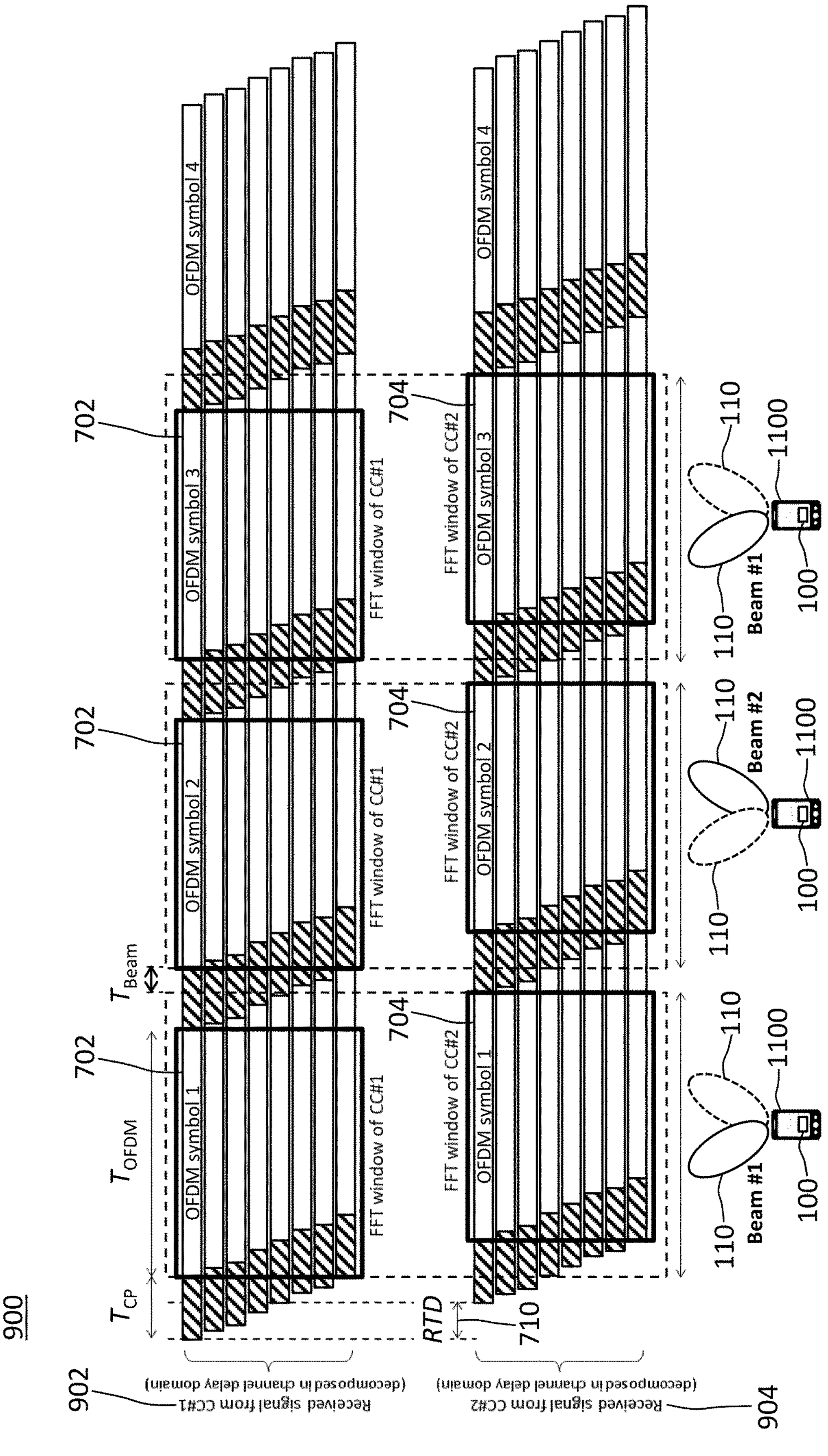
FIG. 9 schematically illustrates an example of two component carriers in the time domain when no gap is scheduled.

An example of this situation is illustrated in FIG. 9. For example, in FIG. 9, when the UE 100 tries to switch RX beam during $T_{Beam}$, due to the RTD 710 between CC #1 at reference sign 902 and CC #2 at reference sign 904, CC #2 is still receiving last portions of data of previous OFDM symbol (briefly: data symbol) while CC #1 is receiving CP of next OFDM symbol. This results in data loss on CC #2. Similarly, if the switching 306 of the RX beam 110 happens during CP of CC #2, CC #1 will be receiving data symbols of next OFDM symbols and which results in data loss.

Since the switching 306 of the RX beam 110 can be frequent in the frequency range 2 (FR2), embodiments of the technique can avoid a significant amount of data loss or throughput loss for CA in FR2, e.g., inter-band CA CBM operation.

FIG. 9 schematically illustrates a time diagram for a radio device 100 (e.g., a CBM UE) receiving different relative timing between CC #1 and CC #2 without a gap, e.g., according to the 3GPP document R4-2112702.

Figure 10:
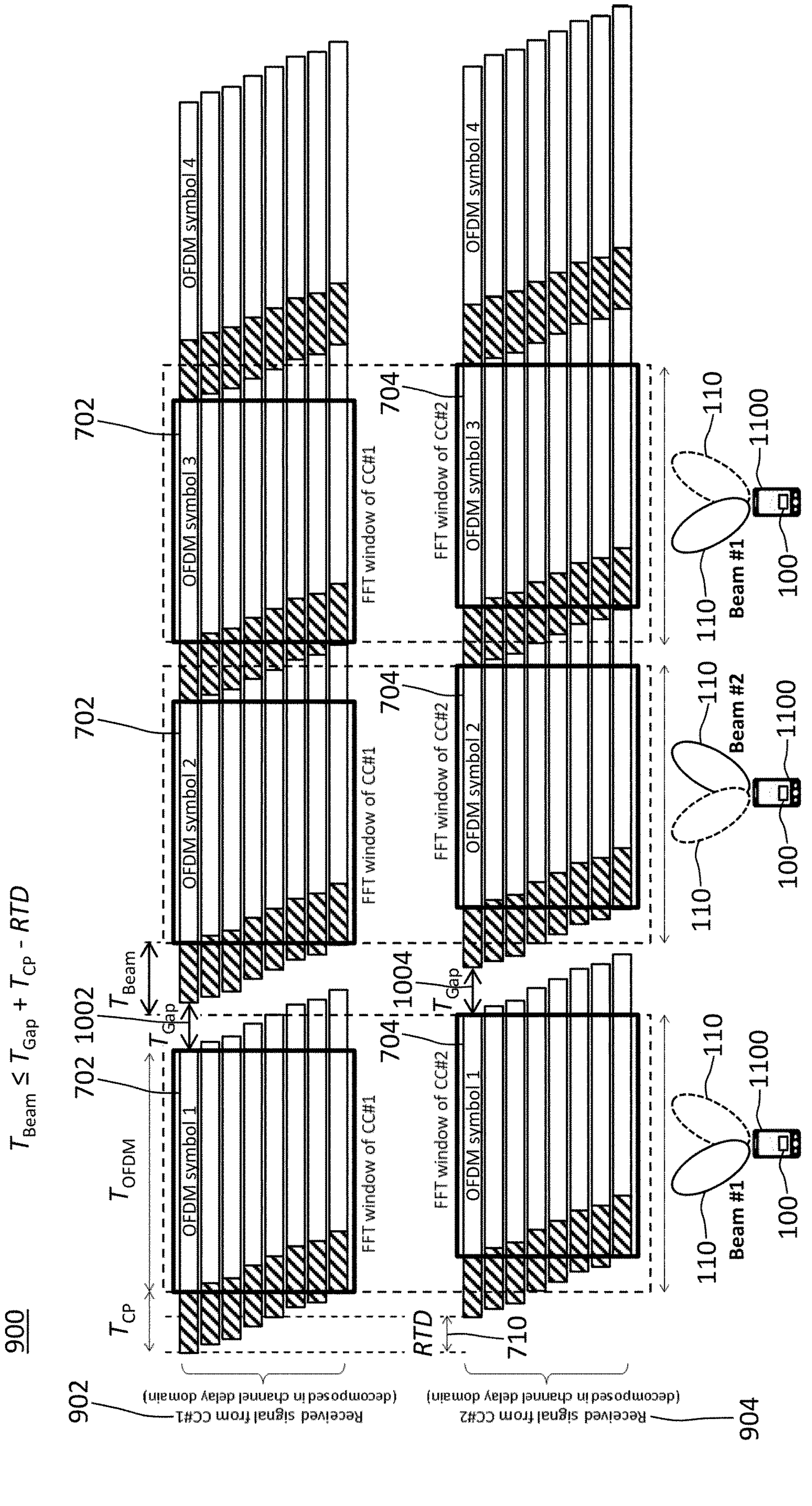
FIG. 10 schematically illustrates an example of two component carriers in the time domain when one gap for each of the component carriers is scheduled.

FIG. 10 schematically illustrates a time diagram for a radio device 100 (e.g., a CBM UE) receiving different relative timing (e.g., RTD 710) and a gap 1000 between CC #1 and CC #2.

The time $T_{Beam}$ available at the UE 100 for switching the RX beam 110 may be equal to or less than $$T_{Gap}+T_{CP}-\text{RTD},$$

wherein RTD is the received time difference (or the maximum RTD, MRTD), $T_{CP}$ is the length (i.e., duration) of the cyclic prefix (CP) of the OFDM symbols 702 and 704, and $T_{Gap}$ is the duration of the gap 1002 and 1004.

Furthermore, if the downlink (DL) channel from the network node 200 to the radio device 100 relies on the cyclic prefix (CP) to absorb a delay spread of the DL channel, the time $T_{Beam}$ available at the UE 100 for switching the RX beam 110 may be equal to or less than $$T_{Gap}-\text{RTD}.$$

Herein, the term node may encompass a network node 200 or a user equipment (UE) 100.

Examples of network nodes 200 are NodeB, base station (BS), multi-standard radio (MSR) radio node such as MSR BS, eNodeB, gNodeB. MeNB, SeNB, location measurement unit (LMU), integrated access backhaul (IAB) node, network controller, radio network controller (RNC), base station controller (BSC), relay, donor node controlling relay, base transceiver station (BTS), Central Unit (e.g. in a gNB), Distributed Unit (e.g. in a gNB), Baseband Unit, Centralized Baseband, C-RAN, access point (AP), transmission points, transmission nodes, transmission reception point (TRP), RRU, RRH, nodes in distributed antenna system (DAS), core network node (e.g. a Mobile-services Switching Centre, MSC; or a Mobility Management Entity, MME; etc.), O&M (or OAM for Operations, administration and management), an Operations support system (OSS), a self-organizing network (SON), a location server (e.g. LMF, E-SMLC, SUPL SLP), etc. The location server may also be referred to as a positioning node or positioning server.

The non-limiting term UE refers to any type of wireless device communicating with a network node and/or with another UE in a cellular or mobile communication system. Examples of UE are target device, device to device (D2D) UE, vehicular to vehicular (V2V), machine type UE, MTC UE or UE capable of machine to machine (M2M) communication, PDA, tablet, mobile terminals, smart phone, laptop embedded equipment (LEE), laptop mounted equipment (LME), USB dongles etc.

The term radio access technology (RAT) may refer to any RAT, e.g. UTRA, E-UTRA, narrow band internet of things (NB-IoT), Wi-Fi, Bluetooth, next generation RAT, New Radio (NR), 4G, 5G, etc. Any of the equipment denoted by the term node, network node or radio network node may be capable of supporting a single or multiple RATs.

The term signal or radio signal used herein can be any physical signal or physical channel. Examples of DL physical signals are reference signal (RS) such as PSS, SSS, CSI-RS, DMRS, signals in SSB, DRS, CRS, TRS, PRS, DRS etc. RS may be periodic e.g. RS occasion carrying one or more RSs may occur with certain periodicity e.g. 20 ms, 40 ms etc. The RS may also be aperiodic. Each SSB carries NR-PSS, NR-SSS and NR-PBCH in 4 successive symbols. One or multiple SSBs are transmit in one SSB burst which is repeated with certain periodicity e.g. 5 ms, 10 ms, 20 ms, 40 ms, 80 ms and 160 ms. The UE is configured with information about SSB on cells of certain carrier frequency by one or more SS/PBCH block measurement timing configuration (SMTC) configurations. The SMTC configuration comprises parameters such as SMTC periodicity, SMTC occasion length in time or duration, SMTC time offset with respect to a reference time (e.g., serving cell's system frame number, SFN), etc. Therefore, SMTC occasion may also occur with certain periodicity e.g. 5 ms, 10 ms, 20 ms, 40 ms, 80 ms and 160 ms. Examples of UL physical signals are reference signal such as SRS, DMRS etc. The term physical channel refers to any channel carrying higher layer information e.g. data, control etc. Examples of physical channels are physical broadcast channel (PBCH), narrowband PBCH (NPBCH), physical downlink control channel (PDCCH), physical downlink shared channel (PDSCH), physical uplink control channel (PUCCH), physical uplink shared channel (PUSCH), short PUCCH (sPUCCH), short PDSCH (sPDSCH), short PUCCH (sPUCCH), short PUSCH (sPUSCH), machine-type communication (MTC) PDCCH (MPDCCH), narrowband PDCCH (NPDCCH), narrowband PDSCH (NPDSCH), enhanced PDCCH (E-PDCCH), narrowband PUSCH (NPUSCH), etc.

The term time resource used herein may correspond to any type of physical resource or radio resource expressed in terms of length of time. Examples of time resources are: symbol, time slot, subframe, radio frame, TTI, interleaving time, slot, sub-slot, mini-slot, SFN cycle, hyper-SFN cycle (e.g. 10 SFN cycles), etc.

The technique may be applied to different scenarios. A scenario comprises a UE 100 configured to receive from multiple component carrier in FR2. The component carriers 902 and 904 can be in different bands of FR2 spectrum. The UE 100 is connected to one or more serving cells 200 operating using a primary CC (PCC) and a secondary CC (SCC) on different bands in FR2 spectrum.

According to NR capabilities specified in Release 16 and 17 by 3GPP, the UE 100 may further be configured to receive through CBM framework or IBM framework. The UE is configured to receive one or more channels (e.g. PDSCH and PDCCH) from the serving cells on PCC and SCC. The PCC and SCC can be transmitted from different antenna panel or different Radio unit. These antenna panel or radio units can be co-located or non-co-located.

The UE may be configured by a serving cell (e.g., PCell, PSCell, SCell, etc.) to perform signal measurements (e.g. L1-RSRP measurements, L1-RSRQ, L1-SINR etc.) for beam management.

In some embodiments, L1-RSRP, may refer to any type of signal measurement performed by the UE on reference signal (RS) of a cell or TRP (Transmission/reception point).

Examples of signal measurement are L1-RSRP, L1-SINR, L1-RSRQ etc. To facilitate the UE to perform the measurements, the UE may be configured by a network node (e.g., serving cell) with RS configuration related to the RSs transmitted by one or more TRPs/Serving cell. In one example, the RS configuration may comprise SSB configuration or SMTC configuration e.g., periodicity, number of SSBs in SSB bursts etc. In one example, the RS configuration may comprise CSI-RS configuration e.g., periodicity of CSI-RS resource, number of CSI-RSs resource in the CSI-RS resource occasion, etc.

In some embodiments, TRP, may refer to any type of radio node transmitting at least RS (e.g. SSB) used by the UE for measurement. The TRP may further be configured (e.g. by the serving TRP) for enabling the UE to operate one or more channels e.g. receiving and/or transmitted channels. The TRP may also be called as a cell.

The technique may be embodied by any one of the following detailed embodiments, optionally alone or in combination with any one of the embodiments described above and/or listed in the list of embodiments.

In a first detailed embodiment, the UE 100 is configured by the network node 200 (also referred to as a radio node) to indicate (e.g., by means of the control message) to the radio node about the at least one (e.g., UL) gaps 1002 and 1004 across CCs 902 and 904, respectively, for switching 306 the RX beam 110 or for RRM measurements (optionally wherein the latter may be an example of switching 306 the RX beam 110).

In any embodiment, the gaps 1002 and 1004 may be computed by or at the UE 100 based on the RTD 710 measured at UE 100.

If, the RTD 710 is less than a predefined (e.g., a certain or configured or specified) first threshold ($Thr_1$), the UE 100 may not indicate any need for (e.g., UL) gaps 1002, 1004 to the radio node 200. That is, the UE 100 may refrain from transmitting the control message being indicative of the request, if the measured RTD 710 is less than the predefined first threshold.

When the UE 100 does not indicate the need for gaps 1002, 1004 to the radio node 200, the UE 100 switches RX beam within a duration of Cyclic Prefix (also: CP length), e.g., as illustrated in FIG. 9.

If the RTD measured and/or computed at the UE 100 is larger than a first threshold, $Thr_1$, the UE 100 indicates by means of the control message the gaps (e.g., 1002, 1004) to the network node 200 (also referred to as radio node).

The indication (i.e., the control message) may request an aperiodic gap.

Examples of gap computation (i.e., gap determination) and/or indication at the UE 100 may be based on at least one of the following conditions and/or input values.

The duration of the gap may be determined (e.g., computed) base on the (e.g., measured) RTD 710 and/or computed by some other method at UE 100. The input values may comprise at least one of the MRDT 710, the RDT 710, one or more existing gaps, optionally the CP length and a duration of the UL/DL and DL/UL switching gap (e.g., a guard period during DL/UL or UL/DL switch in a TDD system).

Alternatively or in addition, the MRTD may change with UE mobility of the UE 100, e.g. since RTD 710 is the relative CC frame start difference at the UE RX. This means that the UE indication (i.e., the control message) has to be (e.g., transmitted 304) as frequent as possible, for instance in each scheduling request (SR) from the UE 100, or through some other UL signal/channel.

In a second detailed embodiment, which may be combined with the first, the UE 100 indicates by means of the control message in the step 304 the need to have (e.g. UL) gap across all CCs (e.g., 902 and 904) and, at the same time, indicates the preferred position of free symbols with possible offset from the slot boundary and length of the gap is indicated. The UE can also indicate if they want the gap to be periodic until otherwise signaled or governed by a timer.

In some example, gap length and gap offset may be fixed at UE which is known to UE and radio node. In such cases, it is necessary to UE to only send a signal though some mechanism to radio node so that radio node will be aware of the gap needed for RX switching. Gap location can be determined by the time of reception of gap indication, that means if gap is indicated by UE at X ms, gap location can be X+Y. Where Y (Y may be in slots or symbols) can be assumed to be known at both radio node and UE.

The radio node scheduler (i.e., a scheduler of the network node 200) may use the indicated position (e.g., as side information) when preparing UL grants or other scheduling decisions.

In a third detailed embodiment, which may be combined with the first and/or second, a UE capability to handle MRTD and/or gaps are signaled to the radio node 200 through a UE capability indication message as an example of the control message in the step 304.

The control message may be transmitted 304 infrequently, e.g., only upon connection establishment.

The gNB scheduler (i.e., a scheduler of the network node 200) may use the indicated capability (e.g., as side information) when preparing UL grants or other scheduling decisions.

For example, if the UE 100 indicates that it can handle only very small MRTD (i.e., small time differences, say 260 ns), then the gNB scheduler may use this to set up a persistent and/or repetitive set of gaps for this UE 100.

In another example, if the UE 100 indicated that it can handle MRTD up to 3 s (e.g., a standardized maximum MRTD), the gNB 200 knows that the gNB 200 may refrain from scheduling any gaps at all or at specific channel conditions only.

In a fourth detailed embodiment, which may be combined with any one of the first, second or third, based on the gaps (e.g., 1002, 1004) indicated by the UE 100 in the control message, the gNB 200 schedules the UE 100 to avoid or minimize a performance loss during the switching 306 of the RX beam 110, e.g., by introducing simultaneous gaps across all CCs (e.g., 902, 904) at positions in time at which the UE can perform beam switching 306, for instance through UL grant or other signaling.

The existence of the at least one gap and/or its position can be made available to the UE 100 in a dedicated message (e.g., the scheduling message or configuration message) to the UE 100, optionally together with a grant and/or in a separate signal to the UE 100.

In a fifth detailed embodiment, which may be combined with any one of the first, second, third or fourth, the gNB 200 may trigger UE RX BM based on CSI and/or may schedule the at least one gap accordingly, e.g., to avoid degraded performance for a CBM UE.

The gNB 200 may resort to adding gaps (e.g., scheduling further gaps), when the gNB 200 schedules the UE 100 if the performance (e.g., in terms of at least one of CSI and RSRP) of the CBM UE 100 is degraded, and/or keep the gaps if the performance improves.

The performance and/or the CSI and/or the RSRP may be report by the UE 100 to the gNB 200.

Alternatively or in addition, the gNB may preemptively schedule the at least one gap and/or increase the number of the scheduled gaps in response to a CSI (e.g., a channel quality indicator, CQI) or performance or RSRP below a predefined threshold. If the preemptively scheduled gaps result in an improved performance, the number of gaps is maintained (e.g., further scheduled at the same rate or periodicity). Otherwise, the number of scheduled gap may be reduced (e.g., to zero or a predefined base value per time).

Herein, CBM UE 100 may refer to any embodiment of the UE that is capable of or configured for CBM.

Figure 11:
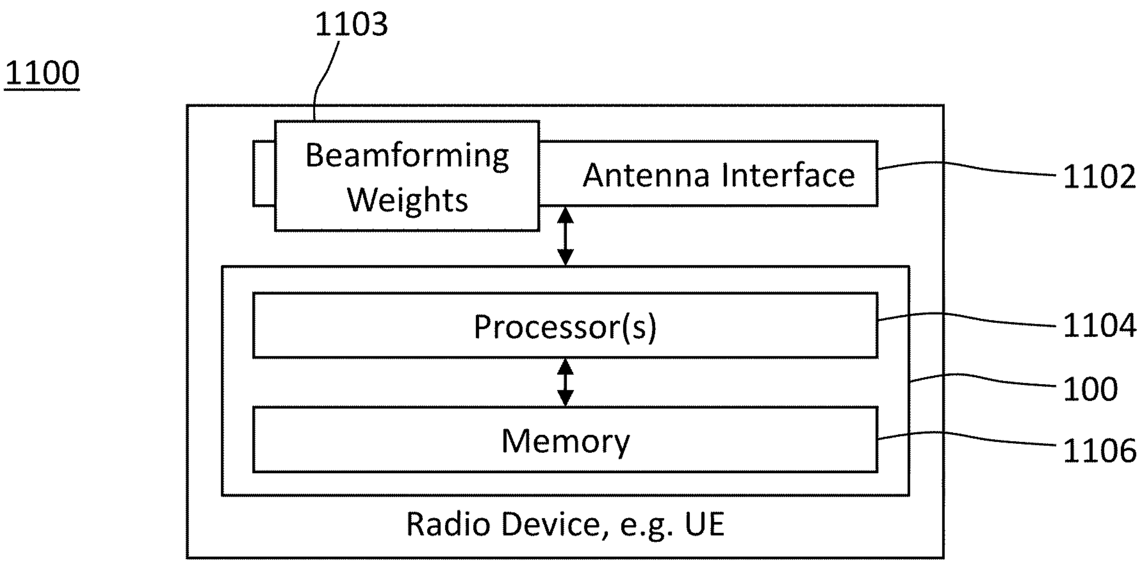
FIG. 11 shows a schematic block diagram of a radio device embodying the device of FIG. 1.

FIG. 11 shows a schematic block diagram for an embodiment of the device 100. The device 100 comprises processing circuitry, e.g., one or more processors 1104 for performing the method 300 and memory 1106 coupled to the processors 1104. For example, the memory 1106 may be encoded with instructions that implement at least one of the modules 102, 104 and 106.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1106, radio device functionality. For example, the one or more processors 1104 may execute instructions stored in the memory 1106. Such functionality may include providing various features and steps discussed herein, including any of the benefits disclosed herein. The expression "the device being operative to perform an action" may denote the device 100 being configured to perform the action.

As schematically illustrated in FIG. 11, the device 100 may be embodied by a radio device 1100, e.g., functioning as a UE. The radio device 1100 comprises a radio interface 1102 coupled to the device 100 for radio communication with one or more network node, e.g., functioning as a gNB.

The radio device 1100 comprises (e.g., stores and/or in a precoder) a vector of beamforming weights 1102 for the RX beam 110.

Figure 12:
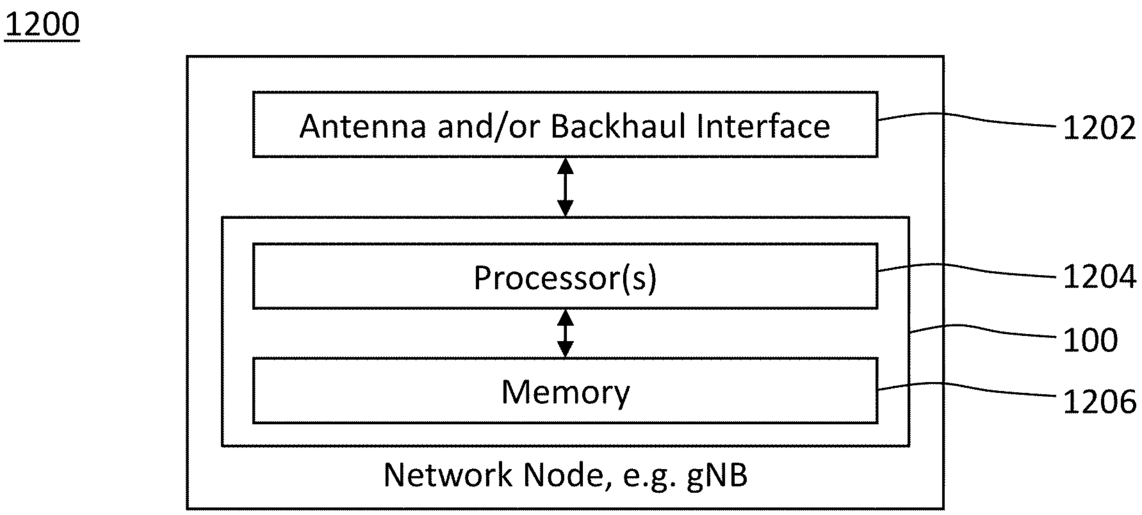
FIG. 12 shows a schematic block diagram of a radio access network, optionally a network node, embodying the device of FIG. 2.

FIG. 12 shows a schematic block diagram for an embodiment of the device 200. The device 200 comprises processing circuitry, e.g., one or more processors 1204 for performing the method 400 and memory 1206 coupled to the processors 1204. For example, the memory 1206 may be encoded with instructions that implement at least one of the modules 202, 204 and 206.

The one or more processors 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1206, network node functionality. For example, the one or more processors 1204 may execute instructions stored in the memory 1206. Such functionality may include providing various features and steps discussed herein, including any of the benefits disclosed herein. The expression "the device being operative to perform an action" may denote the device 200 being configured to perform the action.

As schematically illustrated in FIG. 12, the device 200 may be embodied by a network node 1200, e.g., functioning as a gNB. The network node 1200 comprises a radio (e.g., antenna) interface 1202 (e.g., for the at least two antenna panels 212 and 214) and/or a backhaul interface (e.g., for a backhaul link 220 to another network node 1200 for DC) coupled to the device 200 for radio communication with one or more radio devices, e.g., functioning as UEs.

Figure 13:
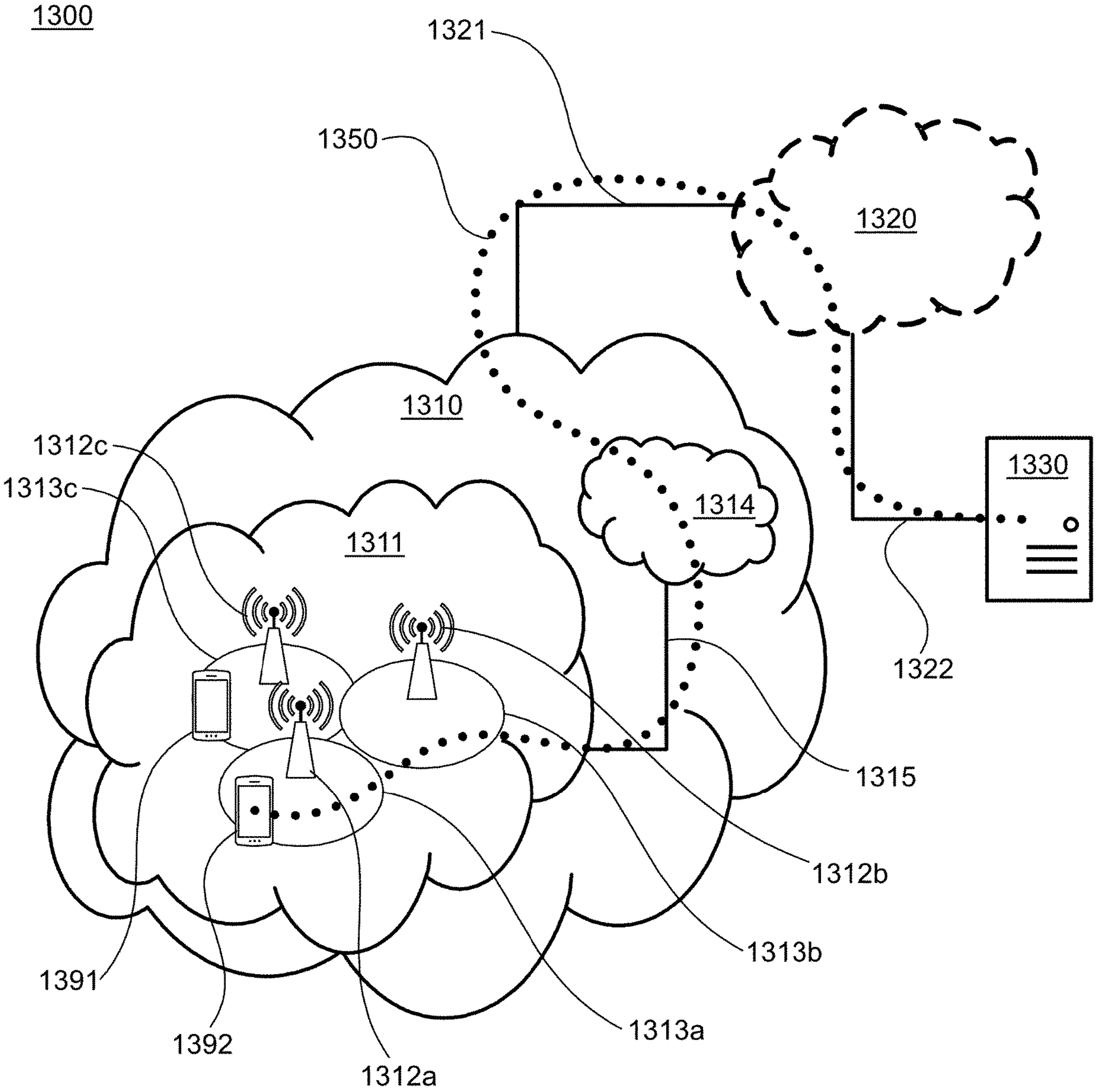
FIG. 13 schematically illustrates an example telecommunication network connected via an intermediate network to a host computer.

With reference to FIG. 13, in accordance with an embodiment, a communication system 1300 includes a telecommunication network 1310, such as a 3GPP-type cellular network, which comprises an access network 1311, such as a radio access network, and a core network 1314. The access network 1311 comprises a plurality of base stations **1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to the core network 1314 over a wired or wireless connection 1315. A first user equipment (UE) 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312**.

Any of the base stations 1312 and the UEs 1391, 1392 may embody the device 100 and 200, respectively.

The telecommunication network 1310 is itself connected to a host computer 1330, which may be embodied in the hardware and/or software of a standalone server, a cloud-implemented server, a distributed server or as processing resources in a server farm. The host computer 1330 may be under the ownership or control of a service provider, or may be operated by the service provider or on behalf of the service provider. The connections 1321, 1322 between the telecommunication network 1310 and the host computer 1330 may extend directly from the core network 1314 to the host computer 1330 or may go via an optional intermediate network 1320. The intermediate network 1320 may be one of, or a combination of more than one of, a public, private or hosted network; the intermediate network 1320, if any, may be a backbone network or the Internet; in particular, the intermediate network 1320 may comprise two or more sub-networks (not shown).

The communication system 1300 of FIG. 13 as a whole enables connectivity between one of the connected UEs 1391, 1392 and the host computer 1330. The connectivity may be described as an over-the-top (OTT) connection 1350. The host computer 1330 and the connected UEs 1391, 1392 are configured to communicate data and/or signaling via the OTT connection 1350, using the access network 1311, the core network 1314, any intermediate network 1320 and possible further infrastructure (not shown) as intermediaries. The OTT connection 1350 may be transparent in the sense that the participating communication devices through which the OTT connection 1350 passes are unaware of routing of uplink and downlink communications. For example, a base station 1312 need not be informed about the past routing of an incoming downlink communication with data originating from a host computer 1330 to be forwarded (e.g., handed over) to a connected UE 1391. Similarly, the base station 1312 need not be aware of the future routing of an outgoing uplink communication originating from the UE 1391 towards the host computer 1330.

By virtue of the method 300 being performed by any one of the UEs 1391 or 1392 and/or the method 400 being performed by any one of the base stations 1312 (i.e., network nodes), the performance or range of the OTT connection 1350 can be improved, e.g., in terms of increased throughput and/or reduced latency. More specifically, the host computer 1330 may indicate to the RAN 500 or the radio device 100 or the network node 200 (e.g., on an application layer) a quality of service (QoS) or any other indicator of the traffic, which may trigger using the technique.

Example implementations, in accordance with an embodiment of the UE, base station and host computer discussed in the preceding paragraphs, will now be described with reference to FIG. 14. In a communication system 1400, a host computer 1410 comprises hardware 1415 including a communication interface 1416 configured to set up and maintain a wired or wireless connection with an interface of a different communication device of the communication system 1400. The host computer 1410 further comprises processing circuitry 1418, which may have storage and/or processing capabilities. In particular, the processing circuitry 1418 may comprise one or more programmable processors, application-specific integrated circuits, field programmable gate arrays or combinations of these (not shown) adapted to execute instructions. The host computer 1410 further comprises software 1411, which is stored in or accessible by the host computer 1410 and executable by the processing circuitry 1418. The software 1411 includes a host application 1412. The host application 1412 may be operable to provide a service to a remote user, such as a UE 1430 connecting via an OTT connection 1450 terminating at the UE 1430 and the host computer 1410. In providing the service to the remote user, the host application 1412 may provide user data, which is transmitted using the OTT connection 1450. The user data may depend on the location of the UE 1430. The user data may comprise auxiliary information or precision advertisements (also: ads) delivered to the UE 1430. The location may be reported by the UE 1430 to the host computer, e.g., using the OTT connection 1450, and/or by the base station 1420, e.g., using a connection 1460.

The communication system 1400 further includes a base station 1420 provided in a telecommunication system and comprising hardware 1425 enabling it to communicate with the host computer 1410 and with the UE 1430. The hardware 1425 may include a communication interface 1426 for setting up and maintaining a wired or wireless connection with an interface of a different communication device of the communication system 1400, as well as a radio interface 1427 for setting up and maintaining at least a wireless connection 1470 with a UE 1430 located in a coverage area (not shown in FIG. 14) served by the base station 1420. The communication interface 1426 may be configured to facilitate a connection 1460 to the host computer 1410. The connection 1460 may be direct, or it may pass through a core network (not shown in FIG. 14) of the telecommunication system and/or through one or more intermediate networks outside the telecommunication system. In the embodiment shown, the hardware 1425 of the base station 1420 further includes processing circuitry 1428, which may comprise one or more programmable processors, application-specific integrated circuits, field programmable gate arrays or combinations of these (not shown) adapted to execute instructions. The base station 1420 further has software 1421 stored internally or accessible via an external connection.

The communication system 1400 further includes the UE 1430 already referred to. Its hardware 1435 may include a radio interface 1437 configured to set up and maintain a wireless connection 1470 with a base station serving a coverage area in which the UE 1430 is currently located. The hardware 1435 of the UE 1430 further includes processing circuitry 1438, which may comprise one or more programmable processors, application-specific integrated circuits, field programmable gate arrays or combinations of these (not shown) adapted to execute instructions. The UE 1430 further comprises software 1431, which is stored in or accessible by the UE 1430 and executable by the processing circuitry 1438. The software 1431 includes a client application 1432. The client application 1432 may be operable to provide a service to a human or non-human user via the UE 1430, with the support of the host computer 1410. In the host computer 1410, an executing host application 1412 may communicate with the executing client application 1432 via the OTT connection 1450 terminating at the UE 1430 and the host computer 1410. In providing the service to the user, the client application 1432 may receive request data from the host application 1412 and provide user data in response to the request data. The OTT connection 1450 may transfer both the request data and the user data. The client application 1432 may interact with the user to generate the user data that it provides.

Figure 14:
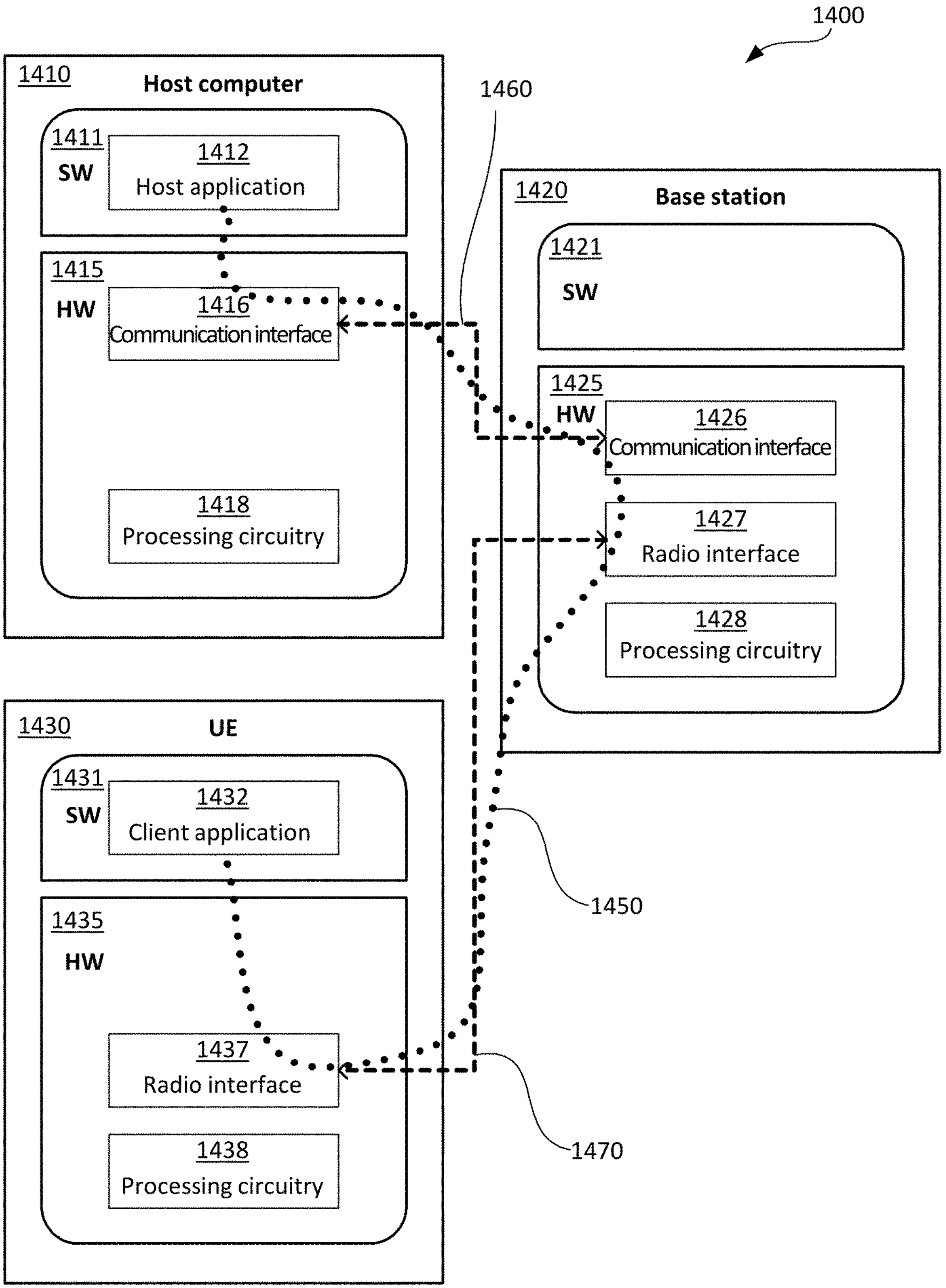
FIG. 14 shows a generalized block diagram of a host computer communicating via a base station or radio device functioning as a gateway with a user equipment over a partially wireless connection.

It is noted that the host computer 1410, base station 1420 and UE 1430 illustrated in FIG. 14 may be identical to the host computer 1330, one of the base stations 1312*a*, 1312*b*, 1312*c* and one of the UEs 1391, 1392 of FIG. 13, respectively. This is to say, the inner workings of these entities may be as shown in FIG. 14, and, independently, the surrounding network topology may be that of FIG. 13.

In FIG. 14, the OTT connection 1450 has been drawn abstractly to illustrate the communication between the host computer 1410 and the UE 1430 via the base station 1420, without explicit reference to any intermediary devices and the precise routing of messages via these devices. Network infrastructure may determine the routing, which it may be configured to hide from the UE 1430 or from the service provider operating the host computer 1410, or both. While the OTT connection 1450 is active, the network infrastructure may further take decisions by which it dynamically changes the routing (e.g., on the basis of load balancing consideration or reconfiguration of the network).

The wireless connection 1470 between the UE 1430 and the base station 1420 is in accordance with the teachings of the embodiments described throughout this disclosure. One or more of the various embodiments improve the performance of OTT services provided to the UE 1430 using the OTT connection 1450, in which the wireless connection 1470 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1450 between the host computer 1410 and UE 1430, in response to variations in the measurement results. The measurement procedure and/or the network functionality for reconfiguring the OTT connection 1450 may be implemented in the software 1411 of the host computer 1410 or in the software 1431 of the UE 1430, or both. In embodiments, sensors (not shown) may be deployed in or in association with communication devices through which the OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of the OTT connection 1450 may include message format, retransmission settings, preferred routing etc.; the reconfiguring need not affect the base station 1420, and it may be unknown or imperceptible to the base station 1420. Such procedures and functionalities may be known and practiced in the art. In certain embodiments, measurements may involve proprietary UE signaling facilitating the host computer's 1410 measurements of throughput, propagation times, latency and the like. The measurements may be implemented in that the software 1411, 1431 causes messages to be transmitted, in particular empty or "dummy" messages, using the OTT connection 1450 while it monitors propagation times, errors etc.

Figure 15:
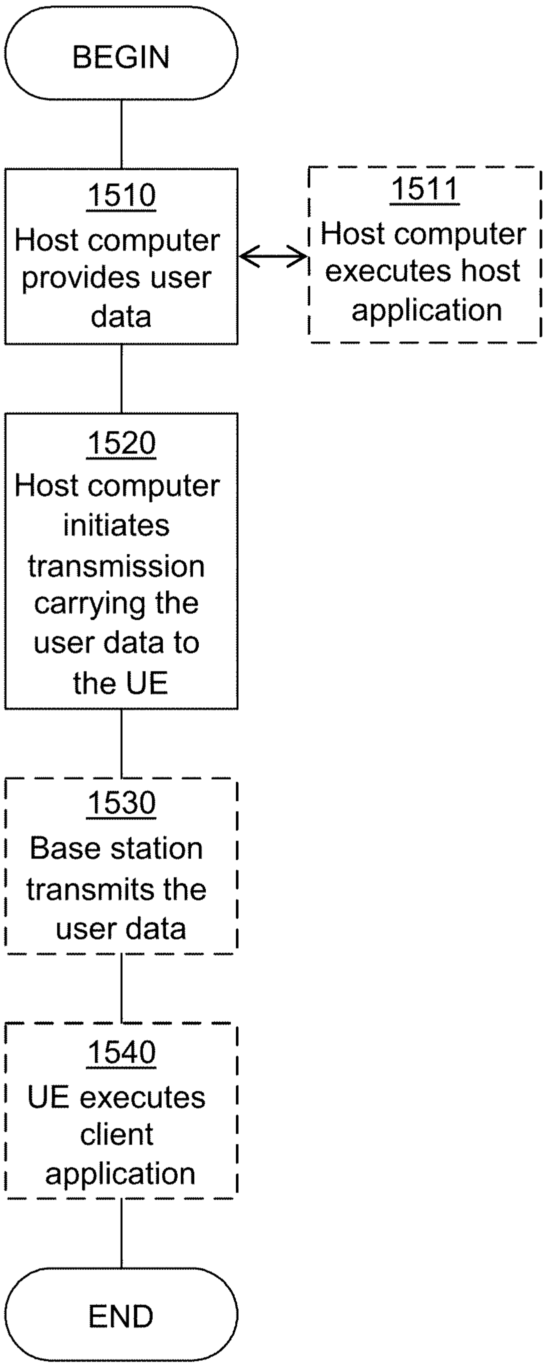
FIGS. 15 and 16 show flowcharts for methods implemented in a communication system including a host computer, a base station or radio device functioning as a gateway and a user equipment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this paragraph. In a first step 1510 of the method, the host computer provides user data. In an optional substep 1511 of the first step 1510, the host computer provides the user data by executing a host application. In a second step 1520, the host computer initiates a transmission carrying the user data to the UE. In an optional third step 1530, the base station transmits to the UE the user data which was carried in the transmission that the host computer initiated, in accordance with the teachings of the embodiments described throughout this disclosure. In an optional fourth step 1540, the UE executes a client application associated with the host application executed by the host computer.

Figure 16:
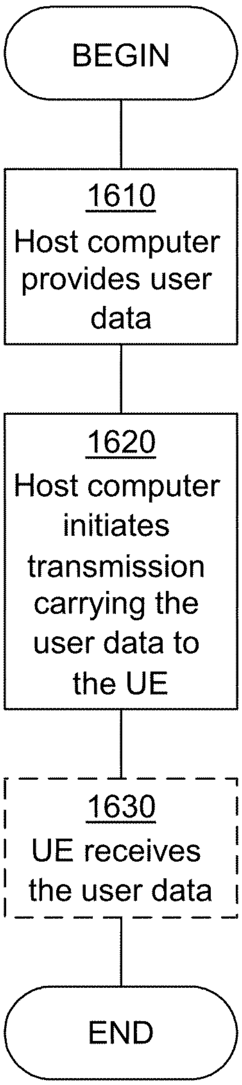

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this paragraph. In a first step 1610 of the method, the host computer provides user data. In an optional substep (not shown) the host computer provides the user data by executing a host application. In a second step 1620, the host computer initiates a transmission carrying the user data to the UE. The transmission may pass via the base station, in accordance with the teachings of the embodiments described throughout this disclosure. In an optional third step 1630, the UE receives the user data carried in the transmission.

As has become apparent from above description, at least some embodiments of the technique can improve a demodulation performance of the radio device if the radio device would have to perform one or more RX beam switches and/or RRM measurements while receiving DL data.

Same or further embodiments can improve the demodulation performance compared to if the radio device only has a cyclic prefix (CP) and/or a time-division duplexing (TDD) switch gap available and/or might end up in cases in which the radio device is time-constrained, i.e., if the radio device is not ready with a beam switch and/or an RRM measurement, but there is no more available time left for the radio device.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method in a radio device for communication with a network node using carrier aggregation (CA), the method comprising:

receiving at least two downlink component carriers (CCs) of the CA from the network node in a common receiver beam (RX beam) of the radio device;

transmitting a control message from the radio device to the network node, the control message relating to at least one temporal gap, for each of the at least two CCs, in at least one of a reception of the communication from the network node at the radio device and a transmission of the communication from the network node to the radio device, wherein the at least one temporal gap on each of the at least two CCs comprises at least one RX beam management gap for switching of the common RX beam and at least one radio resource management (RRM) gap for RRM measurements;

switching the common RX beam during the at least one temporal gap; and performing the RRM measurements in the at least one RRM gap responsive to a scheduling message being indicative of the at least one RRM gap.

2. The method of claim 1, wherein the at least two CCs are received from at least two antenna panels, respectively, of the network node in the common RX beam, and wherein the switching comprises switching the common RX beam from covering the at least two antenna panels to covering another at least two antenna panels.

3. The method of claim 1, wherein at least one of
the respective temporal gaps on the at least two CCs,
respective radio frames on the at least two CCs,
respective subframes on the at least two CCs,
respective slots on the at least two CCs, and
respective orthogonal frequency division multiplexing (OFDM) symbols on the at least two CCs
are offset in time between the at least two CCs according to a received time difference (RTD) at the radio device.

4. The method of claim 3, wherein the RDT is a sum of a timing alignment error (TAE) between the at least two CCs at the network node and a propagation delay difference between the at least two CCs when propagating from the network node to the radio device.

5. The method of claim 1, wherein the control message is indicative of the at least one temporal gap on each of the at least two CCs, by indicating at least one of:
a position of the at least one temporal gap in the time domain;
a gap offset relative to a radio frame, subframe or slot for the at least one temporal gap;
a gap periodicity of the at least one temporal gap; and
a duration of each of the at least one temporal gap.

6. The method of claim 1, wherein the control message is indicative of a request of the radio device for switching the common RX beam in the at least one temporal gap.

7. The method of claim 1, wherein the control message is indicative of a capability of the radio device for switching the common RX beam in the at least one temporal gap.

8. The method of claim 1, further comprising:
receiving the scheduling message from the network node at the radio device, the scheduling message being indicative of the at least one temporal gap on each of the at least two CCs, by indicating at least one of:
a position of the at least one temporal gap in the time domain;
a gap offset relative to a radio frame, subframe or slot for the at least one temporal gap;
a gap periodicity of the at least one temporal gap; and
a duration of each of the at least one temporal gap.

9. The method of claim 1, wherein the at least one temporal gap on each of the at least two CCs is aperiodic or comprises at least one aperiodic temporal gap, wherein the at least one temporal gap comprises a sequence of OFDM symbols across multiple slots.

10. The method of claim 1, wherein the at least one temporal gap on each of the at least two CCs comprises a plurality of periodic temporal gaps.

11. The method of claim 1, wherein the at least one temporal gap on each of the at least two CCs is at an uplink to downlink switch boundary, a downlink to uplink switch boundary, a boundary of a radio frame, a boundary of a subframe, a boundary of a slot or a boundary of an OFDM symbol of the respective CC.

12. The method of claim 1, wherein the common RX beam is a beamformed RX beam of the radio device.

13. The method of claim 1, wherein the switching of the common RX beam comprises changing at least one of: a direction of the common RX beam; a width of the common RX beam; and beamforming weights of the common RX beam.

14. The method of claim 1, wherein the at least one RX beam management gap for the switching of the RX beam and/or at least one RRM gap for the RRM measurements are scheduled based on and/or in response to channel state information (CSI) reported from the radio device to the network node.

15. A method in a network node for communication with a radio device using carrier aggregation (CA), the method comprising:
transmitting at least two downlink component carriers (CCs) of the CA from the network node using at least two quasi-collocated antenna panels, respectively;
receiving a control message from the radio device at the network node, the control message relating to at least one temporal gap, for each of the at least two CCs, in at least one of a transmission of the communication from the network node to the radio device and a reception of the communication from the network node at the radio device, wherein the at least one temporal gap on each of the at least two CCs comprises at least one RX beam management gap for switching of a common receiver (RX) beam of the radio device and at least one radio resource management (RRM) gap for RRM measurements to be performed in the at least one RRM gap responsive to a scheduling message being indicative of the at least one RRM gap; and
switching, during the at least one temporal gap, the transmission of the at least two downlink CCs of the CA to at least two other quasi-collocated antenna panels and/or transmitting a scheduling message indicative of the at least one temporal gap to the radio device for the radio device to switch the common RX beam during the at least one temporal gap.

16. A radio device for communication with a network node using carrier aggregation (CA), the radio device comprising:
memory configured to store instructions; and
processing circuitry configured to execute the instructions such that the radio device is configured to:
receive at least two downlink component carriers (CCs) of the CA from the network node in a common receiver beam (RX beam) of the radio device;
transmit a control message from the radio device to the network node, the control message relating to at least one temporal gap, for each of the at least two CCs, in at least one of a reception of the communication from the network node at the radio device and a transmission of the communication from the network node to the radio device, wherein the at least one temporal gap on each of the at least two CCs comprises at least one RX beam management gap for switching of the common RX beam and at least one radio resource management (RRM) gap for RRM measurements;
switch the common RX beam during the at least one temporal gap; and
perform the RRM measurements in the at least one RRM gap responsive to a scheduling message being indicative of the at least one RRM gap.

17. The radio device of claim 16, wherein the at least two CCs are received from at least two antenna panels, respectively, of the network node in the common RX beam, and wherein the switching comprises switching the common RX beam from covering the at least two antenna panels to covering another at least two antenna panels.

18. The radio device of claim 16, wherein at least one of
the respective temporal gaps on the at least two CCs,
respective radio frames on the at least two CCs,
respective subframes on the at least two CCs,
respective slots on the at least two CCs, and respective orthogonal frequency division multiplexing (OFDM) symbols on the at least two CCs are offset in time between the at least two CCs according to a received time difference (RTD) at the radio device.

19. A user equipment (UE) comprising the radio device of claim 16.

20. A network node for communication with a radio device using carrier aggregation (CA), the network node comprising:

memory configured to store instructions; and processing circuitry configured to execute the instructions such that the network node is configured to:

transmit at least two downlink component carriers (CCs) of the CA from the network node using at least two quasi-collocated antenna panels, respectively;

receive a control message from the radio device at the network node, the control message relating to at least one temporal gap, for each of the at least two CCs, in at least one of a transmission of the communication from the network node to the radio device and a reception of the communication from the network node at the radio device, wherein the at least one temporal gap on each of the at least two CCs comprises at least one RX beam management gap for switching of a common receiver (RX) beam of the radio device and at least one radio resource management (RRM) gap for RRM measurements to be performed in the at least one RRM gap responsive to a scheduling message being indicative of the at least one RRM gap; and switch, during the at least one temporal gap, the transmission of the at least two downlink CCs of the CA to at least two other quasi-collocated antenna panels and/or transmitting a scheduling message indicative of the at least one temporal gap to the radio device for the radio device to switch the common RX beam during the at least one temporal gap.

* * * * *